United States Patent
Saito et al.

(10) Patent No.: US 11,100,471 B2
(45) Date of Patent: *Aug. 24, 2021

(54) WARNING APPARATUS FOR PREVENTING ELECTRONIC MAIL WRONG TRANSMISSION, ELECTRONIC MAIL TRANSMISSION SYSTEM, AND PROGRAM

(71) Applicant: SOLITON SYSTEMS K.K., Tokyo (JP)

(72) Inventors: Tomohito Saito, Tokyo (JP); Nobuo Kamata, Tokyo (JP)

(73) Assignee: SOLITON SYSTEMS K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,147

(22) Filed: May 14, 2019

(65) Prior Publication Data

US 2019/0266570 A1 Aug. 29, 2019

Related U.S. Application Data

(63) Continuation of application No. 15/565,678, filed as application No. PCT/JP2015/076040 on Sep. 14, 2015, now Pat. No. 10,311,408.

(30) Foreign Application Priority Data

Apr. 10, 2015 (JP) .................................. 2015-080864
Jun. 5, 2015 (JP) .................................. 2015-115282

(51) Int. Cl.
*G06Q 10/10* (2012.01)
*G06F 13/00* (2006.01)
*H04L 12/58* (2006.01)

(52) U.S. Cl.
CPC ........... *G06Q 10/107* (2013.01); *G06F 13/00* (2013.01); *H04L 51/16* (2013.01); *H04L 51/28* (2013.01); *H04L 51/30* (2013.01)

(58) Field of Classification Search
CPC ......... H04L 51/28; H04L 51/12; H04L 51/18; H04L 51/34; H04L 51/30; H04L 63/168;
(Continued)

(56) References Cited

U.S. PATENT DOCUMENTS 6,564,264 B1 * 5/2003 Creswell ................. G06Q 10/10
709/206
6,601,059 B1 * 7/2003 Fries ...................... G06F 16/951
(Continued)

FOREIGN PATENT DOCUMENTS

JP 05-225086 A 9/1993
JP 3663844 B2 6/2005
(Continued)

OTHER PUBLICATIONS

Ishikawa, "Next Generation Database and Data Mining," May 1, 2005, pp. 187, 188, CQ Publishing Co., Ltd., First Edition. (cited in the Japanese Application No. 2015-080864 Office Action dated Jun. 1, 2015).
(Continued)

*Primary Examiner* — Greg C Bengzon
(74) *Attorney, Agent, or Firm* — Alston & Bird LLP

(57) ABSTRACT

An electronic mail wrong transmission determination apparatus includes: a feature information creation unit which creates feature information related to contents of an electronic mail that is a transmission object; an accumulation unit which accumulates feature information related to contents of a transmitted electronic mail and a destination of the transmitted electronic mail in association with each other; a
(Continued)

destination candidate selection unit which selects destination candidates that are similar in appearance to a destination of the electronic mail that is the transmission object, from destinations of transmitted electronic mails; a similarity model creation unit which creates a similarity model for each destination accumulated in the accumulation unit based on the feature information accumulated in the accumulation unit in association with the destination and based on the feature information accumulated in the accumulation unit in association with other destinations that differ from the destination; wherein the similarity model serves as a criterion of determination as to whether or not feature information related to contents of an arbitrary electronic mail belongs to a certain feature information region in the word space, which is defined according to the contents of the electronic mails transmitted to the destination so far; and a reliability calculation unit which calculates respective reliabilities of a destination and destination candidates of the electronic mail that is the transmission object, based on feature information related to contents of the electronic mail that is the transmission object, based on the similarity model related to the destination of the electronic mail that is the transmission object, and based on the similarity models related to the destination candidates.

8 Claims, 18 Drawing Sheets

(58) Field of Classification Search
CPC . H04L 29/12066; H04L 51/00; H04L 51/063;
H04L 51/066; H04L 51/16; H04L
61/1511; H04L 61/307; H04L 63/0236;
H04L 63/0281; H04L 63/0428; H04L
63/123; H04L 63/1408; H04L 63/1416;
H04L 63/20; H04L 29/1215; H04L 51/04;
H04L 51/24; H04L 61/1564; G06F 16/35;
G06F 16/353; G06F 16/93; G06F 16/285;
G06F 16/287; G06F 16/313; G06F
16/3322; G06F 16/334; G06F 16/335;
G06F 16/345; G06F 16/355; G06F
16/358; G06F 16/954; G06F 16/958;
G06F 17/21; G06F 17/271; G06F
17/2755; G06F 17/2765; G06F 17/278;
G06F 17/2785; G06F 3/0236; G06F
3/0237; G06F 3/04842; G06F 3/0488;
G10L 15/26; G10L 15/30; G16H 10/60;
G06Q 10/10; G06Q 10/107; G06N 20/00;
G06N 5/02; G06N 5/047; G06N 7/005
See application file for complete search history.

(56) References Cited

U.S. PATENT DOCUMENTS

| | | | | |
|---|---|---|---|---|
| 6,671,718 B1* | 12/2003 | Meister | ............... | G06Q 10/107 709/201 |
| 6,745,193 B1* | 6/2004 | Horvitz | ............... | H04L 51/24 707/796 |
| 6,816,884 B1* | 11/2004 | Summers | ............. | G06Q 10/107 709/202 |
| 6,952,281 B1* | 10/2005 | Irons | ............... | H04N 1/00127 358/1.15 |
| 7,593,995 B1 | 9/2009 | He et al. | | |
| 7,634,463 B1* | 12/2009 | Katragadda | ............ | G06Q 10/10 707/999.102 |
| 7,743,051 B1 | 6/2010 | Kashyap et al. | | |
| 8,050,983 B1* | 11/2011 | Eakin | ............... | G06Q 20/4016 705/26.35 |
| 8,090,781 B2 | 1/2012 | Sano | | |
| 8,132,110 B1 | 3/2012 | Appelman et al. | | |
| 8,726,165 B1* | 5/2014 | Phillips | ............... | G06F 40/166 715/739 |
| 8,868,409 B1* | 10/2014 | Mengibar | .............. | G06F 40/30 704/9 |
| 8,892,672 B1* | 11/2014 | Rackliffe | ............... | H04L 51/32 709/206 |
| 8,943,155 B2* | 1/2015 | Fields | ............... | G06F 16/24578 709/206 |
| 9,047,368 B1 | 6/2015 | Cooley | | |
| 9,075,498 B1 | 7/2015 | Wiggins et al. | | |
| 9,305,289 B2* | 4/2016 | Roic | ............... | G06Q 10/107 |
| 10,115,060 B2* | 10/2018 | Chestnut | ............. | G06Q 10/107 |
| 10,311,408 B2 | 6/2019 | Saito et al. | | |
| 2002/0065891 A1* | 5/2002 | Malik | ............... | H04L 29/1215 709/206 |
| 2002/0087647 A1* | 7/2002 | Quine | ............... | H04L 51/28 709/206 |
| 2002/0143879 A1* | 10/2002 | Sommerer | ........... | G06Q 10/107 709/206 |
| 2003/0037114 A1* | 2/2003 | Nishio | ............... | H04L 51/28 709/206 |
| 2003/0093483 A1* | 5/2003 | Allen | ............... | G06Q 10/107 709/207 |
| 2003/0115279 A1* | 6/2003 | Quine | ............... | H04L 51/00 709/207 |
| 2003/0115280 A1* | 6/2003 | Quine | ............... | H04L 61/1564 709/207 |
| 2003/0140309 A1* | 7/2003 | Saito | ............... | G06F 16/345 715/259 |
| 2003/0167402 A1 | 9/2003 | Stolfo et al. | | |
| 2003/0191969 A1* | 10/2003 | Katsikas | ............ | H04L 63/0245 726/12 |
| 2004/0155869 A1* | 8/2004 | Robinson | .............. | G06F 3/0238 345/168 |
| 2004/0193684 A1* | 9/2004 | Ben-Yoseph | ........... | H04L 67/24 709/204 |
| 2004/0196858 A1* | 10/2004 | Tsai | ............... | H04L 45/00 370/401 |
| 2004/0203949 A1* | 10/2004 | Nielsen | ................ | H04L 51/28 455/466 |
| 2004/0243844 A1* | 12/2004 | Adkins | ............... | G06Q 10/107 726/11 |
| 2005/0010644 A1* | 1/2005 | Brown | ............... | H04L 51/30 709/206 |
| 2005/0210107 A1* | 9/2005 | Mora | ............... | H04L 51/12 709/206 |
| 2006/0026244 A1* | 2/2006 | Watson | ............... | H04L 51/28 709/206 |
| 2006/0029296 A1* | 2/2006 | King | ............... | G06F 16/9554 382/313 |
| 2006/0098899 A1* | 5/2006 | King | ............... | H04N 1/2187 382/305 |
| 2006/0135135 A1* | 6/2006 | Rybak | ............... | H04W 88/02 455/414.1 |
| 2006/0212522 A1* | 9/2006 | Walter | ............... | H04L 51/28 709/206 |
| 2006/0218088 A1* | 9/2006 | Flora | ............... | G06Q 20/10 705/39 |
| 2006/0276916 A1* | 12/2006 | Dearing | ............... | G06Q 10/10 700/79 |
| 2007/0067394 A1* | 3/2007 | Adams | ............... | G06Q 10/107 709/206 |
| 2007/0100991 A1* | 5/2007 | Daniels | ............... | H04L 51/34 709/224 |
| 2007/0106741 A1* | 5/2007 | Christoff | ............... | G06Q 10/107 709/206 |
| 2007/0146777 A1* | 6/2007 | Cranitch | ............ | H04N 21/4117 358/1.15 |
| 2007/0208868 A1* | 9/2007 | Kidd | ............... | G06Q 10/107 709/229 |
| 2007/0268897 A1* | 11/2007 | Nishikawa | ............ | H04L 47/522 370/389 |
| 2007/0288575 A1* | 12/2007 | Gillum | ............... | G06Q 10/107 709/206 |

(56) References Cited

U.S. PATENT DOCUMENTS

| | | | | |
|---|---|---|---|---|
| 2007/0288578 | A1* | 12/2007 | Pantalone | G06F 3/0236 709/206 |
| 2008/0040432 | A1* | 2/2008 | Murphy | G06Q 10/107 709/206 |
| 2008/0114846 | A1* | 5/2008 | Sano | H04L 51/28 709/206 |
| 2008/0120556 | A1* | 5/2008 | Bedingfield | H04L 51/28 715/752 |
| 2008/0168142 | A1* | 7/2008 | Chung | G06Q 10/107 709/206 |
| 2008/0250114 | A1* | 10/2008 | Dubovsky | G06Q 10/107 709/206 |
| 2009/0006391 | A1* | 1/2009 | Ram | G06F 16/35 |
| 2009/0049140 | A1* | 2/2009 | Stoddard | G06Q 10/107 709/206 |
| 2009/0112994 | A1* | 4/2009 | Vander Veen | G06Q 10/107 709/206 |
| 2009/0113001 | A1* | 4/2009 | Manning | H04L 51/12 709/206 |
| 2009/0157650 | A1 | 6/2009 | Chow et al. | |
| 2009/0157821 | A1* | 6/2009 | Biasi | B07C 3/14 709/206 |
| 2009/0182818 | A1* | 7/2009 | Krywaniuk | H04L 51/28 709/206 |
| 2009/0210504 | A1* | 8/2009 | Shuster | H04L 51/30 709/206 |
| 2009/0249232 | A1* | 10/2009 | Lundy | H04M 1/72484 715/764 |
| 2009/0300491 | A1* | 12/2009 | Wasmund | G06Q 10/107 715/700 |
| 2009/0307315 | A1* | 12/2009 | Murphy, Jr. | G06Q 10/107 709/206 |
| 2009/0327243 | A1* | 12/2009 | Pradhan | G06F 16/285 |
| 2010/0153324 | A1* | 6/2010 | Downs | G06F 40/258 706/21 |
| 2010/0235452 | A1* | 9/2010 | Fukasawa | H04L 51/30 709/206 |
| 2010/0274860 | A1* | 10/2010 | Hirota | G06Q 10/107 709/206 |
| 2010/0312837 | A1* | 12/2010 | Bodapati | G06Q 10/107 709/206 |
| 2010/0332975 | A1* | 12/2010 | Chang | G06Q 10/107 715/256 |
| 2011/0016020 | A1 | 1/2011 | Emigh | |
| 2011/0029525 | A1* | 2/2011 | Knight | G06F 16/93 707/737 |
| 2011/0087746 | A1* | 4/2011 | Sagi | G06Q 10/107 709/206 |
| 2011/0128389 | A1* | 6/2011 | Maeda | H04N 21/6162 348/207.1 |
| 2011/0234524 | A1* | 9/2011 | Longe | G06F 40/232 345/173 |
| 2011/0282948 | A1* | 11/2011 | Vitaldevara | G06Q 10/10 709/206 |
| 2012/0072519 | A1* | 3/2012 | Oda | G06Q 10/107 709/206 |
| 2012/0089692 | A1 | 4/2012 | Stoddard et al. | |
| 2012/0150979 | A1* | 6/2012 | Monaco | G06F 16/337 709/206 |
| 2012/0179761 | A1 | 7/2012 | Fuhrmann | |
| 2012/0191786 | A1* | 7/2012 | Downing | G06Q 10/107 709/206 |
| 2012/0191789 | A1* | 7/2012 | Endo | H04L 51/22 709/206 |
| 2012/0246720 | A1 | 9/2012 | Xie et al. | |
| 2013/0080543 | A1* | 3/2013 | Jang | H04L 51/12 709/206 |
| 2013/0166663 | A1* | 6/2013 | Fields | G06F 3/0484 709/206 |
| 2013/0198192 | A1* | 8/2013 | Hu | G06F 16/35 707/738 |
| 2013/0218984 | A1* | 8/2013 | Langlois | H04L 51/36 709/206 |
| 2013/0262590 | A1* | 10/2013 | Patil | H04L 51/24 709/206 |
| 2013/0290435 | A1* | 10/2013 | Martin | H04L 51/28 709/206 |
| 2013/0326393 | A1* | 12/2013 | Namioka | G06F 3/0484 715/780 |
| 2014/0058725 | A1* | 2/2014 | Longe | G06F 3/02 704/9 |
| 2014/0165137 | A1 | 6/2014 | Balinsky et al. | |
| 2014/0168716 | A1* | 6/2014 | King | G06Q 10/10 358/473 |
| 2014/0230066 | A1 | 8/2014 | Hurwitz et al. | |
| 2014/0344371 | A1* | 11/2014 | Schiller | H04L 51/066 709/206 |
| 2015/0020195 | A1* | 1/2015 | Alizadeh-Shabdiz | H04L 61/2046 726/22 |
| 2015/0074203 | A1 | 3/2015 | Eichinger et al. | |
| 2015/0106665 | A1* | 4/2015 | Choh | H04L 51/08 714/57 |
| 2015/0113081 | A1* | 4/2015 | Deedwaniya | G06Q 10/107 709/206 |
| 2015/0143255 | A1* | 5/2015 | Agrawal | H04L 51/02 715/752 |
| 2015/0143257 | A1* | 5/2015 | Fields | G06F 16/3322 715/752 |
| 2015/0150098 | A1* | 5/2015 | Murphy | G16H 10/60 726/4 |
| 2015/0199333 | A1* | 7/2015 | Nekhay | G06F 40/30 704/9 |
| 2015/0312197 | A1* | 10/2015 | Dong | H04L 51/02 715/752 |
| 2016/0014151 | A1* | 1/2016 | Prakash | H04L 63/1483 726/22 |
| 2016/0062984 | A1* | 3/2016 | Caliendo, Jr. | G06F 3/0488 704/9 |
| 2016/0065520 | A1* | 3/2016 | Puranik | H04L 51/16 715/752 |
| 2016/0173424 | A1* | 6/2016 | Fuhrmann | G16H 80/00 709/206 |
| 2017/0041275 | A1* | 2/2017 | Downing | H04L 63/168 |
| 2017/0142059 | A1 | 5/2017 | Shuster | |
| 2017/0177800 | A1 | 6/2017 | Fuhrmann | |
| 2018/0054447 | A1* | 2/2018 | Greevy | H04L 63/123 |
| 2018/0075414 | A1* | 3/2018 | Saito | H04L 51/28 |

FOREIGN PATENT DOCUMENTS

| | | |
|---|---|---|
| JP | 2005-225086 A | 8/2005 |
| JP | 2007-241807 A | 9/2007 |
| JP | 2007-241881 A | 9/2007 |
| JP | 2010-134811 A | 6/2010 |
| JP | 4817952 B2 | 11/2011 |
| JP | 2012-014573 A | 1/2012 |
| JP | 2012-027719 A | 2/2012 |
| JP | 2012-230463 A | 11/2012 |
| JP | 2014-010698 A | 1/2014 |
| JP | 2015-001854 A | 1/2015 |
| WO | WO 1999/067731 A1 | 12/1999 |

OTHER PUBLICATIONS

Japanese Application No. 2015-080864, Office Action dated Jun. 1, 2015.

Japanese Application No. 2015-080864, Notice of Allowance dated Aug. 8, 2015.

Japanese Application No. 2015-115282, Office Action dated Oct. 21, 2015.

Japanese Application No. 2015-115282, Notice of Allowance dated Jan. 7, 2016.

WIPO Application No. PCT/JP2015/076040, International Search Report, dated Nov. 2, 2015.

WIPO Application No. PCT/JP2015/076040, Written Opinion of the International Searching Authority, dated Nov. 2, 2015.

(56) References Cited

OTHER PUBLICATIONS

WIPO Application No. PCT/JP2015/076040, International Preliminary Report on Patentability, dated Oct. 10, 2017.
Baghel et al., "A Frequent Concepts Based Document Clustering Algorithm," International Journal of Computer Applications, (0975-8887), vol. 4, No. 5, (Jul. 1010).
Matveeva et al., "Multilevel Measures of Document Similarity," Dept. of Computer Science, University of Chicago, pp. 1-7, Jun. 12, 2010.
U.S. Appl. No. 15/565,678 Non-final Office Action dated May 29, 2018.
U.S. Appl. No. 15/565,678 Final Office Action dated Dec. 17, 2018.
U.S. Appl. No. 15/565,678 Notice of Allowance dated Mar. 29, 2019.

\* cited by examiner

*FIG. 6*

| PROPER NOUNS | CORRESPONDENCE INDEX |
|---|---|
| XYZ | 2744 |
| CORPORATION | 94 |
| SAITO | 125 |
| REQUEST | 865 |
| OPTION | 9673 |
| SPECIFICATIONS | 673 |
| SERVER | 7 |
| ESTIMATE | 67 |
| ... | ... |

(2744:1, 94:1, 125:1, 865:2, · · ·)

CORRESPONDENCE INDEX: OCCURRENCE FREQUENCY COUNTER

FIG. 14

|   | ADDRESS 1 | ADDRESS 2 | FREQUENCY | LAST UPDATED DATE/TIME |
|---|---|---|---|---|
| 1 | aaa@aaa.com | bbb@bbb.com | 1 | 2015/5/5 15:10 |
| 2 | aaa@aaa.com | ccc@ccc.com | 5 | 2013/12/21 13:32 |
| 3 | aaa@aaa.com | ddd@ddd.com | 9 | 2012/9/15 16:35 |
| 4 | bbb@bbb.com | ccc@ccc.com | 2 | 2015/3/3 9:03 |
| 5 | bbb@bbb.com | ddd@ddd.com | 4 | 2013/8/12 4:49 |
| 6 | ccc@ccc.com | ddd@ddd.com | 6 | 2014/9/25 10:49 |

WARNING APPARATUS FOR PREVENTING ELECTRONIC MAIL WRONG TRANSMISSION, ELECTRONIC MAIL TRANSMISSION SYSTEM, AND PROGRAM

CROSS-REFERENCE TO RELATED APPLICATIONS

The present application is a continuation of U.S. application Ser. No. 15/565,678 filed Oct. 10, 2017, which is a U.S. National Stage of International Application No. PCT/JP2015/076040, filed Sep. 14, 2015, which claims the benefit of Japanese Patent Application No. 2015-080864, filed on Apr. 10, 2015, and Japanese Patent Application No. 2015-115282, filed on Jun. 5, 2015, each of which is incorporated herein by reference in its entirety.

TECHNICAL FIELD

The present invention relates to an electronic mail wrong transmission determination apparatus, an electronic mail transmission system, and a recording medium.

BACKGROUND ART

Conventionally, techniques for preventing wrong transmission of an electronic mail have been disclosed (refer to PTL 1 and PTL 2).

PTL 1 describes a technique for controlling, based on a comparison between an occurrence frequency of prescribed vocabulary in a body of a given electronic mail and an occurrence frequency of the vocabulary in bodies of electronic mails previously transmitted to the same destination as a destination of the given electronic mail, whether the given electronic mail is to be transmitted or transmission thereof is to be suspended.

Furthermore, PTL 1 describes a technique for supporting determination of whether or not there is a wrong transmission based on a politeness of the body of the given electronic mail and a presence or absence of a signature attached to the body of the given electronic mail.

PTL 2 describes a technique including analysis means for analyzing validity of a destination address of a transmission mail created by a user based on message data of all previously transmitted mails stored in transmitted mail recording means, display means for displaying a result of the analysis, and transmission execution means for accepting a transmission instruction by the user having viewed the displayed result and for executing transmission of the transmission mail.

PTL 2 further describes that the analysis means calculates a similarity between each address in a group of destination addresses, which is included in a similarity group of transmitted mails to which the transmission mail belongs, among the plural of similarity groups of transmitted mails constructed by clustering means according to a similarity of message data, and a destination address of the transmission mail; and proposes a destination address of a transmitted mail, the similarity of which is highest, as a correction candidate of the destination address.

CITATION LIST

Patent Literature

[PTL 1] Japanese Patent No. 3663844
[PTL 2] Japanese Patent No. 4817952

SUMMARY OF INVENTION

Technical Problem

The present invention has been made in order to solve problems existing in conventional art.

Solution to Problem

An electronic mail wrong transmission determination apparatus according to the present invention includes: a feature information creation unit which creates feature information related to contents of an electronic mail that is a transmission object;
an accumulation unit which accumulates feature information related to contents of a transmitted electronic mail and a destination of the transmitted electronic mail in association with each other;
a destination candidate selection unit which selects destination candidates that are similar in appearance to a destination of the electronic mail that is the transmission object, from destinations of transmitted electronic mails;
a similarity model creation unit which creates a similarity model for each destination accumulated in the accumulation unit based on the feature information accumulated in the accumulation unit in association with the destination and based on the feature information accumulated in the accumulation unit in association with other destinations that differ from the destination;
wherein the similarity model separates a feature information region associated with the destination and a feature information region associated with the other destinations from each other in a word space composed of dimensions of the number of words included in electronic mails and serves as a criterion of determination as to whether or not feature information related to contents of an arbitrary electronic mail belongs to the feature information region associated with the destination;
a reliability calculation unit which calculates respective reliabilities of a destination and destination candidates of the electronic mail that is the transmission object, based on feature information which is related to contents of the electronic mail that is the transmission object and which is created by the feature information creation unit, based on the similarity model which is related to the destination of the electronic mail that is the transmission object and which is created by the similarity model creation unit, and based on the similarity models which are related to the destination candidates of the electronic mail that is the transmission object and which are created by the similarity model creation unit;
a wrong transmission determination unit which determines whether or not a possibility of the destination of the electronic mail that is the transmission object being wrong is high, by comparing respective reliabilities calculated by the reliability calculation unit;
and
a selection unit which, when the wrong transmission determination unit determines that the possibility of the destination of the electronic mail that is the transmission object being wrong is high, selects destination candidates with higher reliabilities than the reliability of the destination of the electronic mail that is the transmission object.

An electronic mail transmission system according to the present invention includes: an electronic mail creation unit which creates an electronic mail that is a transmission object of which destination is specified; the electronic mail wrong transmission determination apparatus which determines whether or not a possibility of the destination of the electronic mail that is the transmission object created by the electronic mail creation unit being wrong is high; and a transmission unit which transmits the electronic mail that is the transmission object when it is determined by the electronic mail wrong transmission determination apparatus that the possibility of the destination being wrong is not high, or which suspends transmission of the electronic mail that is the transmission object when it is determined that the possibility of the destination being wrong is high.

An electronic mail transmission system according to the present invention includes: an electronic mail creation unit which creates an electronic mail that is a transmission object of which destination is specified; the electronic mail wrong transmission determination apparatus which determines whether or not a possibility of the destination of the electronic mail that is the transmission object created by the electronic mail creation unit being wrong is high; a display unit which displays a destination candidate selected by the selection unit of the electronic mail wrong transmission determination apparatus; and a transmission unit which transmits the electronic mail that is the transmission object when it is determined by the electronic mail wrong transmission determination apparatus that the possibility of the destination being wrong is not high or which suspends transmission of the electronic mail that is the transmission object when it is determined that the possibility of the destination being wrong is high, and which transmits, when one of the destination candidates displayed by the display unit is specified during the suspension of transmission, the electronic mail that is the transmission object to the specified destination candidate.

An electronic mail transmission program according to the present invention is a program for causing a computer to function as respective units of the electronic mail wrong transmission determination apparatus.

In addition, an electronic mail transmission program according to the present invention is a program for causing a computer to function as respective units of the electronic mail transmission system.

Advantageous Effects of Invention

The present invention can prevent a wrong destination address and prevent wrong transmission of an electronic mail with high accuracy.

BRIEF DESCRIPTION OF DRAWINGS

FIG. 6 is a diagram showing a noun dictionary.

FIG. 14 is a diagram showing a frequency table.

DESCRIPTION OF EMBODIMENTS

Hereinafter, embodiments of the present invention will be described in detail with reference to the drawings.

First Embodiment

Figure 1:
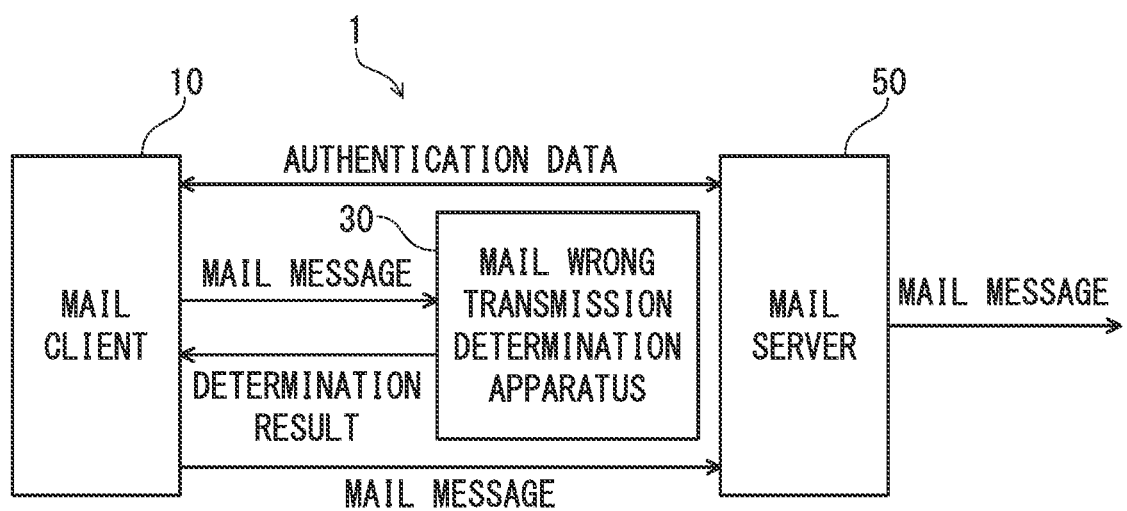
FIG. 1 is a diagram showing a schematic configuration of an electronic mail transmission system.

FIG. 1 is a diagram showing a schematic configuration of an electronic mail transmission system 1.

The electronic mail transmission system 1 includes a mail client 10 which performs creation and transmission processing of a mail message, a mail wrong transmission determination apparatus 30 which determines a possibility of a wrong transmission of an electronic mail created by the mail client 10, and a mail server 50 which transmits a mail message transmitted from the mail client 10 to a destination address.

Figure 2:
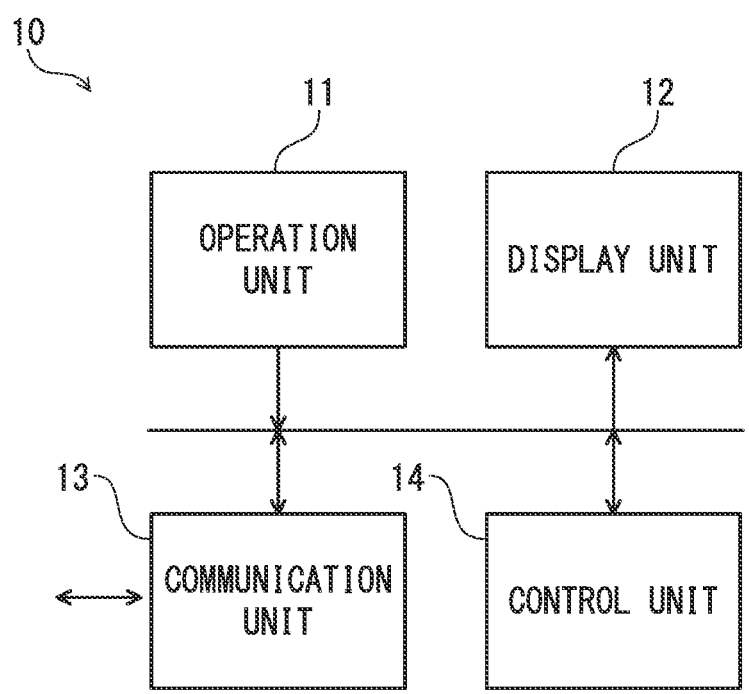
FIG. 2 is a diagram showing a configuration of a mail client.

FIG. 2 is a diagram showing a configuration of the mail client 10.

The mail client 10 includes an operation unit 11 on which operations by a user are performed, a display unit 12, a communication unit 13 which performs communication processing of data with the outside, and a control unit 14 which controls behavior of the respective units.

The operation unit 11 outputs information in accordance with operations by the user including information such as an input mail message, a transmission instruction, and a selection instruction.

The display unit 12 displays information from the operation unit 11, information received by the communication unit 13 from the outside, control information from the control unit 14, and the like. For example, the display unit 12 displays information necessary for the user to make a determination such as an input mail message and a destination address candidate.

Based on control by the control unit 14, the communication unit 13 communicates with the mail wrong transmission determination apparatus 30 or the mail server 50. For example, the communication unit 13 transmits authentication data to the mail server 50 and receives authentication data to the effect that authentication has been made from the mail server 50. The communication unit 13 transmits a mail message scheduled to be transmitted to the mail wrong transmission determination apparatus 30 and receives a determination result representing a possibility of a mail wrong transmission or the like from the mail wrong transmission determination apparatus 30. In addition, when the possibility of a mail wrong transmission is low, the communication unit 13 transmits the mail message to the mail server 50.

The mail client 10 configured as described above transmits a mail message to the mail server 50 according to the following procedure.

Figure 3:
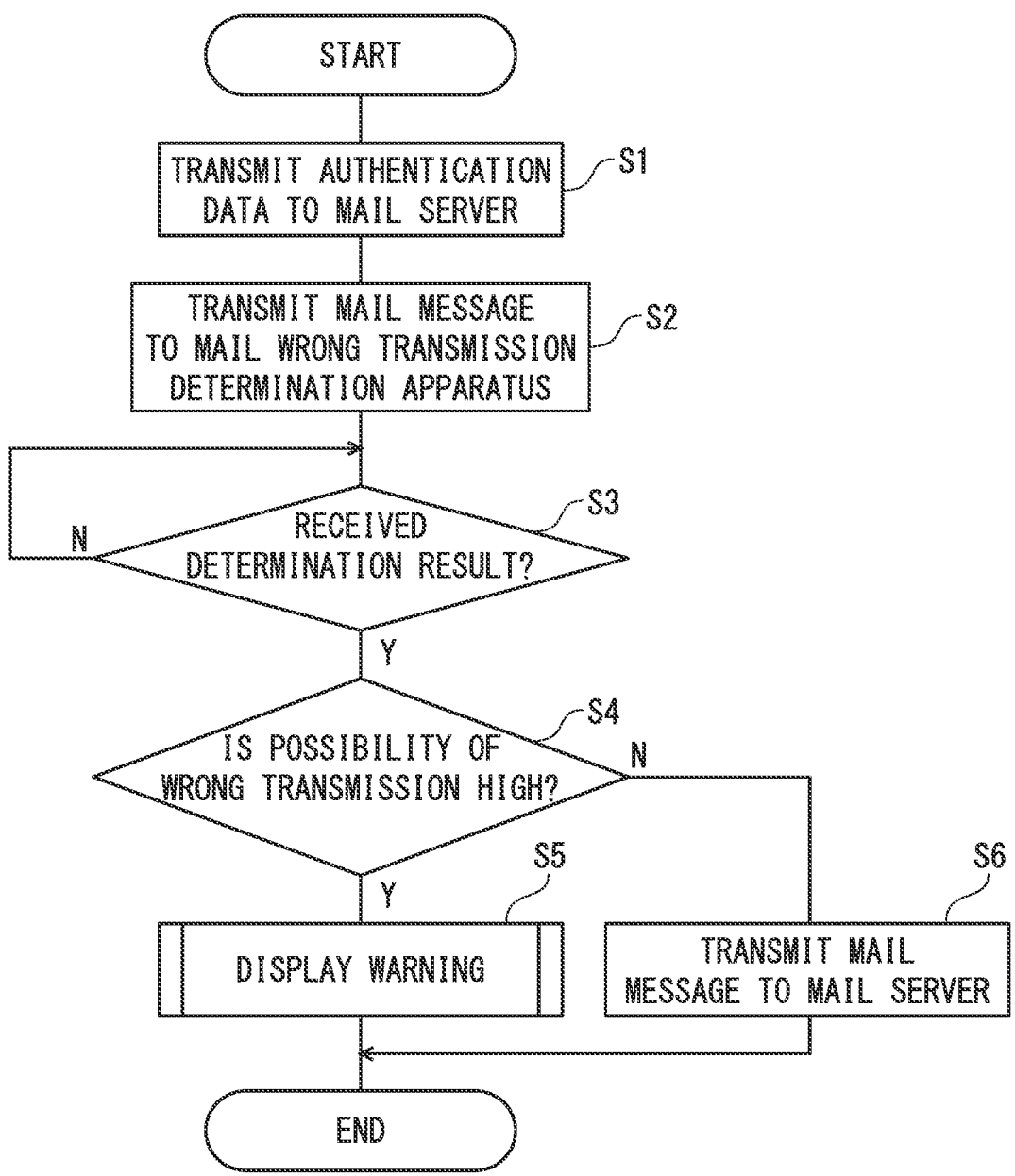
FIG. 3 is a flowchart showing a mail transmission processing routine of a mail client.

FIG. 3 is a flow chart showing a mail transmission processing routine of the mail client 10.

In step S1, the mail client 10 transmits authentication data to the mail server 50 and, upon receiving authentication data to the effect that authentication has been made from the mail server 50, advances to step S2.

In step S2, the mail client 10 transmits a mail message scheduled to be transmitted to the mail wrong transmission determination apparatus 30 and advances to step S3.

In step S3, the mail client 10 stands by until a determination result indicating a possibility of wrong transmission is received from the mail wrong transmission determination apparatus 30 and, once the determination result is received, advances to step S4.

Moreover, when transmitting a determination result to the effect that a possibility of wrong transmission is high to the mail client 10, the mail wrong transmission determination apparatus 30 also transmits one or more destination address candidates to replace the destination address. In addition, in order to prompt the mail client 10 to verify the determination result, the mail wrong transmission determination apparatus 30 may also transmit reliability of each of the destination address and the destination address candidates.

In step S4, the mail client 10 analyzes the determination result and determines whether or not the possibility of wrong transmission is high, and advances to step S5 in the case of a positive determination (when the possibility of wrong transmission is high) but advances to step S6 in the case of a negative determination.

In step S5, the mail client 10 performs display processing in order to warn about the possibility of wrong transmission. Specifically, the mail client 10 executes a warning display routine to be described later and ends the present routine.

In step S6, since the possibility of wrong transmission is low, the mail client 10 transmits a mail message to the mail server 50 and ends the present routine. In addition, the mail server 50 transmits the mail message transmitted from the mail client 10 to the destination address in accordance with a prescribed protocol.

Figure 4:
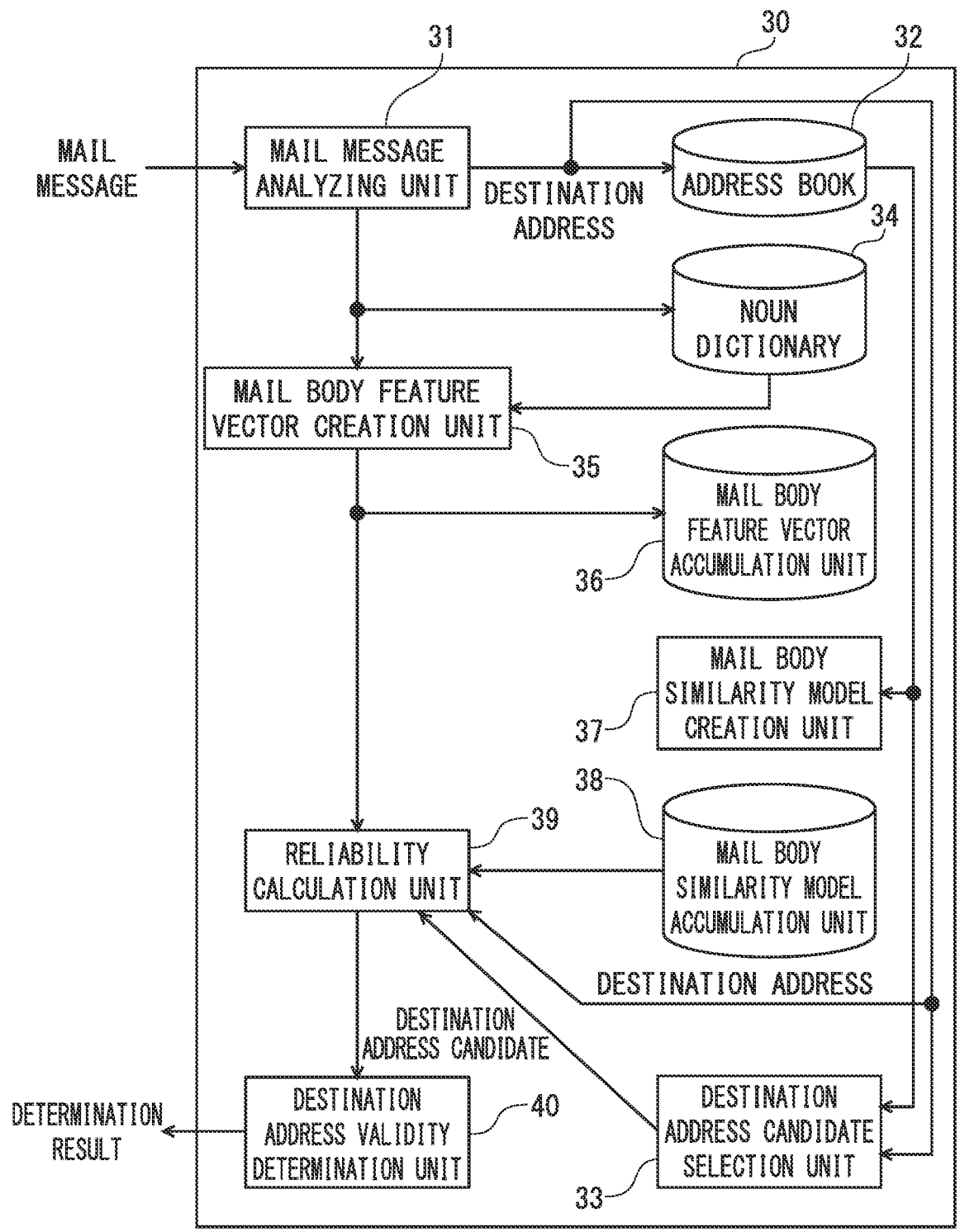
FIG. 4 is a block diagram showing a configuration of a mail wrong transmission determination apparatus.

FIG. 4 is a block diagram showing a configuration of the mail wrong transmission determination apparatus 30.

The mail wrong transmission determination apparatus 30 includes a mail message analyzing unit 31 which analyzes a mail message transmitted from the mail client 10, an address book 32 which is a storage unit for storing destination addresses of transmitted mail messages, a destination address candidate selection unit 33 which selects destination address candidates to replace a destination address from the addresses stored in the address book 32, a noun dictionary 34 which is a storage unit for storing nouns, and a mail body feature vector creation unit 35 which creates a feature vector of a mail message.

Here, the user can also select an address to be stored in the address book 32. In other words, the addresses stored in the address book 32 may be all destination addresses of transmitted mail messages or addresses selected by the user from all of the destination addresses.

The mail wrong transmission determination apparatus 30 further includes a mail body feature vector accumulation unit 36 which accumulates mail body feature vectors, a mail body similarity model creation unit 37 which creates mail body similarity models, a mail body similarity model accumulation unit 38 which accumulates mail body similarity models, a reliability calculation unit 39 which calculates reliabilities, and a destination address validity determination unit 40 which determines a validity of a destination address.

Figure 5:
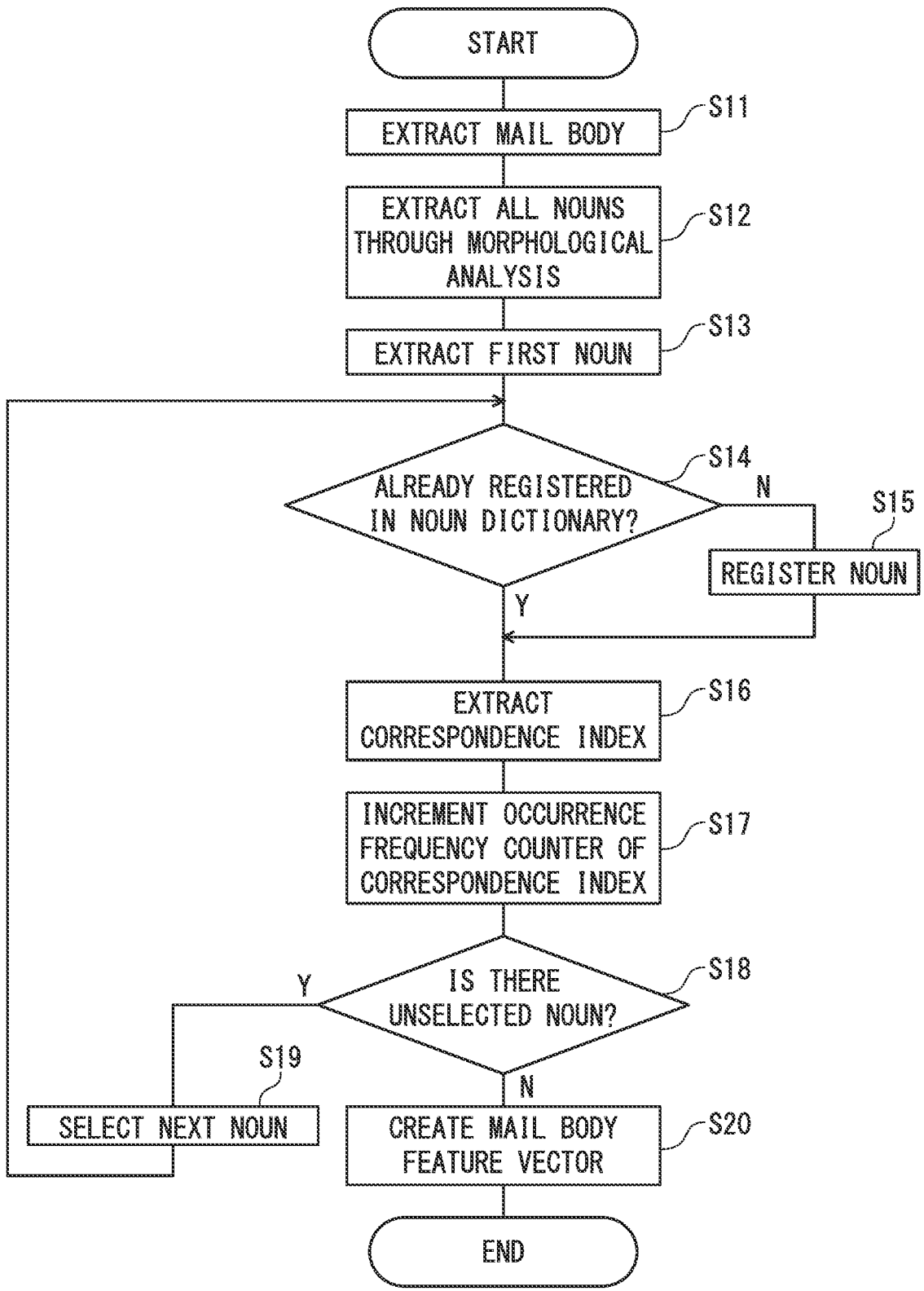
FIG. 5 is a flow chart showing a mail body feature vector creation routine.

FIG. 5 is a flow chart showing a mail body feature vector creation routine.

In step S11, the mail message analyzing unit 31 extracts a mail body from a mail message and further extracts a destination address from the mail message, and advances to step S12. Moreover, when the extracted destination address is not stored in the address book 32, the destination address is written into the address book 32.

In a case when a destination address has a prescribed feature such as having a domain which is the same as a domain of a transmitting party, the destination address needs not to be written into the address book 32. In other words, only electronic mails to be transmitted to a domain which differs from the domain of the transmitting party may be considered an object of determination of wrong transmission in that case.

In step S12, the mail message analyzing unit 31 performs morphological analysis on the mail body and, using the noun dictionary, extracts all nouns included in the mail body. For example, the nouns extracted at this point are preferably verbal nouns, common nouns, and proper nouns. This is because respective occurrence frequencies of verbal nouns, common nouns, and proper nouns vary significantly depending on contents of the mail body. Alternatively, the mail message analyzing unit 31 may extract a word belonging to a part of speech other than nouns as long as the word characterizes contents of the mail body.

In step S13, the mail message analyzing unit 31 selects a first noun from all extracted nouns and advances to step S14.

In step S14, the mail message analyzing unit 31 determines whether or not the noun being selected is registered in the noun dictionary 34, and advances to step S15 when not registered but advances to step S16 when registered.

FIG. 6 is a diagram showing the noun dictionary 34. A noun and a correspondence index which is an index associated one-to-one to the noun are registered in the noun dictionary 34. The correspondence index is a value for uniquely identifying a noun, and an order (a serial number beginning with 0) in which the noun is registered to the noun dictionary 34 is adopted in the present embodiment.

Here, the correspondence index is not limited to the order of registration as long as the correspondence index is a value capable of uniquely identifying a noun in the noun dictionary 34, and therefore, the correspondence index may be, for example, a UUID (Universally Unique IDentifier) or a hash value (a numerical value derived by a hash function using a character string as input) of the noun. When the UUID or the hash value is used, the correspondence index becomes globally unique. As a result, a plurality of noun dictionaries 34 can be unified into one noun dictionary 34 or one noun dictionary 34 can be shared by a plurality of mail client users.

In step S15, since the noun being selected is not registered in the noun dictionary 34, the mail message analyzing unit 31 generates a new correspondence index with respect to the noun, forms a pair of the noun and the correspondence index created in association with the noun, registers the pair in the noun dictionary 34, and advances to step S16.

In step S16, the mail message analyzing unit 31 extracts a correspondence index of the noun being selected from the noun dictionary 34 and advances to step S17.

In step S17, the mail message analyzing unit 31 increments an occurrence frequency counter of the extracted correspondence index and advances to step S18. Therefore, every time a noun is extracted from the mail body, the occurrence frequency counter of the noun (correspondence index) increases by 1.

In step S18, the mail message analyzing unit 31 determines whether or not there is an unselected noun among all nouns extracted in step S12, and advances to step S19 when there is an unselected noun but advances to step S20 when there is no unselected noun.

In step S19, the mail message analyzing unit 31 selects a next noun from the unselected nouns and returns to step S14. In this manner, the processing from step S14 to step S19 is repeated until all of the nouns extracted in step S12 are used to increment the occurrence frequency counter of the correspondence index.

In step S20, the mail message analyzing unit 31 outputs a pair of the correspondence index and the occurrence frequency counter for every noun included in the mail body to the mail body feature vector creation unit 35. The mail body feature vector creation unit 35 creates a mail body feature vector by arranging the correspondence indexes and the occurrence frequency counters output from the mail message analyzing unit 31 in a prescribed order.

Figure 7:
FIG. 7 is a diagram showing a mail body feature vector.

FIG. 7 is a diagram showing a mail body feature vector. As shown in the diagram, a mail body feature vector is an arrangement of pairs of the correspondence index and the occurrence frequency counter in a prescribed order. The mail body feature vector created by the mail body feature vector creation unit 35 is associated with a destination address and accumulated in the mail body feature vector accumulation unit 36.

In this manner, mail body feature vectors of all mail messages transmitted to the mail wrong transmission determination apparatus 30 are sequentially accumulated in the mail body feature vector accumulation unit 36. Subsequently, the present routine ends.

Here, the mail body feature vector accumulation unit 36 may accumulate only mail body feature vectors transmitted during a period from a prescribed time point, which precedes a current time point, to the current time point, instead of continuously accumulating the mail body feature vectors of all transmitted mail messages. In other words, the mail body feature vector accumulation unit 36 may delete mail body feature vectors which are older than the prescribed period preceding the current time point.

Alternatively, the mail body feature vector accumulation unit 36 may accumulate only mail body feature vectors of mail messages, the destination addresses of which have been already stored in the address book 32, instead of accumulating the mail body feature vectors of all transmitted mail messages.

Figure 8:
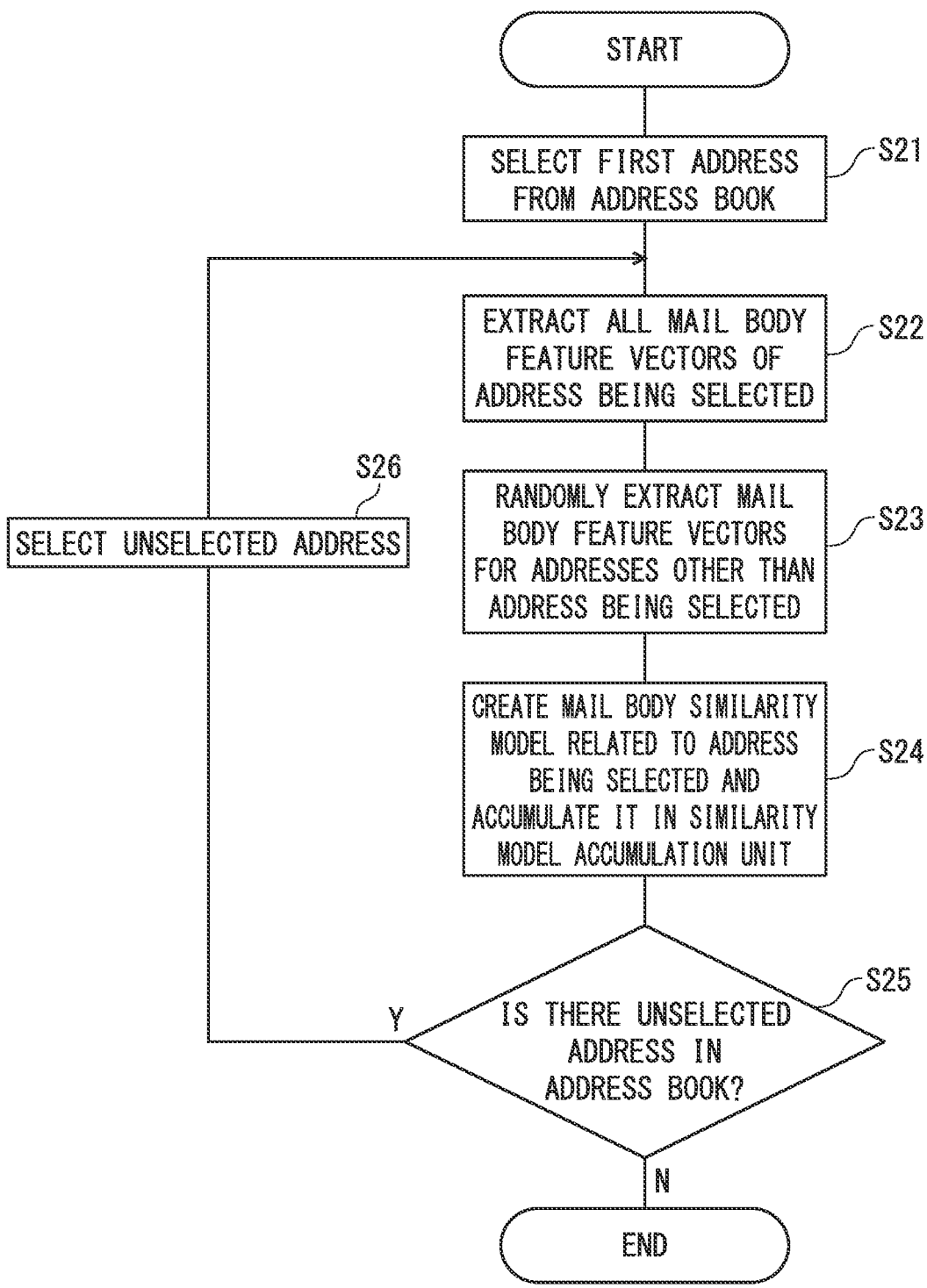
FIG. 8 is a flowchart showing a mail body similarity model creation routine.

FIG. 8 is a flow chart showing a mail body similarity model creation routine. The present routine is batch-processed at prescribed time intervals such as every 24 hours.

In step S21, the mail body similarity model creation unit 37 selects a first address from the address book 32 and advances to step S22. While an example of the first address is a destination address registered first in the address book 32 in the present embodiment, the first address is not limited thereto and may instead be an arbitrary address registered in the address book 32.

Alternatively, addresses to be selected from the address book 32 may be limited to addresses related to a mail body similarity model to be updated instead of all registered addresses. Here, the mail body similarity model to be updated corresponds to a mail body similarity model related to an address, to which, despite having an electronic mail newly transmitted to the address related to the mail body similarity model, the transmission is not reflected.

In step S22, the mail body similarity model creation unit 37 extracts all mail body feature vectors having the address being selected as a destination address from the mail body feature vector accumulation unit 36, and advances to step S23.

In step S23, the mail body similarity model creation unit 37 randomly extracts mail body feature vectors having an address other than the address being selected as a destination address from the mail body feature vector accumulation unit 36, and advances to step S24. Here, the number of mail body feature vectors extracted in the present step is the same as the number of mail body feature vectors extracted in step S22.

In step S23, mail body feature vectors having an address other than the address being selected as a destination address are "randomly" extracted in order to retain a generic feature (a generic tendency of deviation) of a group of mail body feature vectors having an address other than the address being selected as a destination address. In addition, in step S23, the "same" number of the mail body feature vectors as the number of the mail body feature vectors extracted in step S22 are extracted in order to equalize, with respect to a mail body similarity model, a contribution from a group of mail body feature vectors having the address being selected as a destination address with a contribution from a group of mail body feature vectors having an address other than the address being selected as a destination address.

In other words, in step S23, mail body feature vectors are "randomly" extracted in the "same" number as in step S22 in order to create a mail body similarity model which enables mail wrong transmission determination to be performed with high accuracy. However, the "random" extraction of mail body feature vectors in step S23 in the "same" number as in step S22 is not essential. In other words, a mail body similarity model necessary for mail wrong transmission determination can be created even if such conditions are not satisfied.

In step S24, the mail body similarity model creation unit 37 creates a mail body similarity model related to the address being selected using the groups of mail body feature vectors extracted in steps S22 and S23. The mail body similarity model is created using, for example, an SVM (Support Vector Machine).

In the SVM, when a word space composed of dimensions of the total number of nouns used in mail bodies of all electronic mails is assumed, a mail body feature vector extracted from a mail body of one electronic mail is represented as one data point in the word space. If an optimum hyperplane can be created in the word space, which appropriately separates data points represented by a group of all mail body feature vectors having a given address as a destination address extracted in step S22 from data points represented by a group of mail body feature vectors having an address other than the given address as a destination address extracted in step S23, an arbitrary data point in the word space can be classified by the hyperplane.

In consideration thereof, the mail body similarity model creation unit 37 creates a mail body similarity model as the hyperplane using the SVM. Then, the mail body similarity model creation unit 37 accumulates the mail body similarity model in the mail body similarity model accumulation unit 38 and advances to step S25.

In step S25, the mail body similarity model creation unit 37 determines whether or not there is an unselected address among addresses that are selection objects in the addresses registered in the address book 32, and advances to step S26 when there is an unselected address but ends the present routine when there is no unselected address.

In step S26, the mail body similarity model creation unit 37 selects an unselected address and returns to step S22. By repeating the processing from step S22 to step S26, the mail body similarity model creation unit 37 creates mail body similarity models related to all addresses that are selection objects in the addresses registered in the address book 32, and accumulates the mail body similarity models in the mail body similarity model accumulation unit 38. Accordingly, the latest mail body similarity models related to all of the addresses registered in the address book 32 are accumulated in the mail body similarity model accumulation unit 38.

Figure 9:
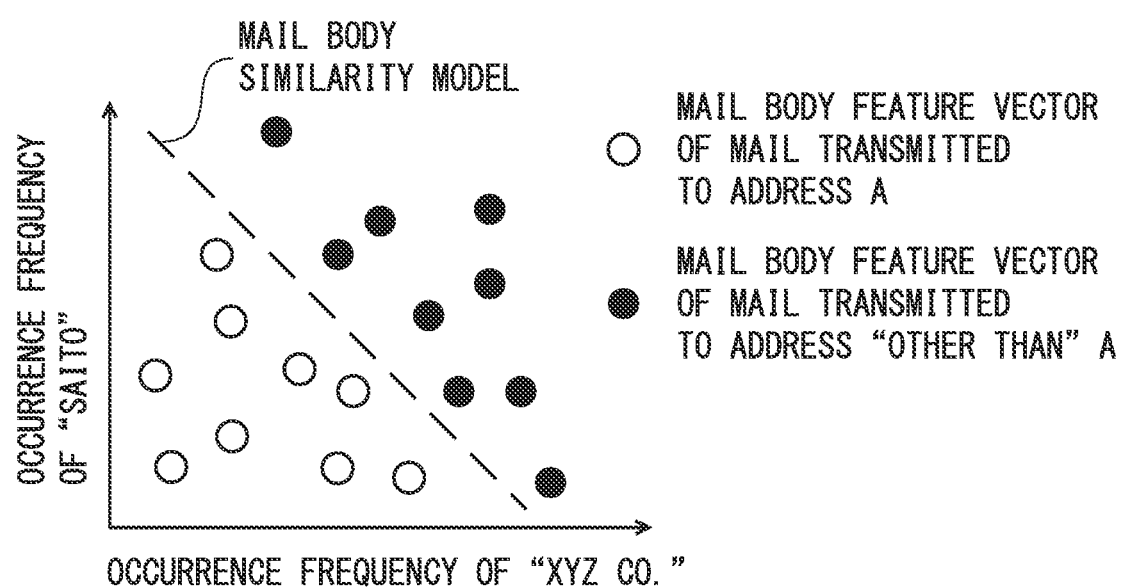
FIG. 9 is a diagram showing an example of a mail body similarity model related to a prescribed destination address.

FIG. 9 is a diagram showing an example of a mail body similarity model related to a prescribed address (address A). In this case, a two-dimensional word space is assumed, which is composed of two axes for "XYZ Co." and "Saito"—the only nouns included in all the mail bodies. In this case, the mail body similarity model is expressed as a dashed line drawn in FIG. 9. In FIG. 9, open circles denote data points represented by a group of mail body feature vectors of transmitted mail bodies with the address A as their destination addresses. On the other hand, filled circles denote data points represented by a group of mail body feature vectors of transmitted mail bodies with addresses other than the address A as their destination addresses. Here, the mail body similarity model related to the address A is expressed as a hyperplane (in this case, a straight line) which separates, with the highest probability, a region in which open circles exists and a region in which filled circles exist from each other in the two-dimensional word space.

Figure 10:
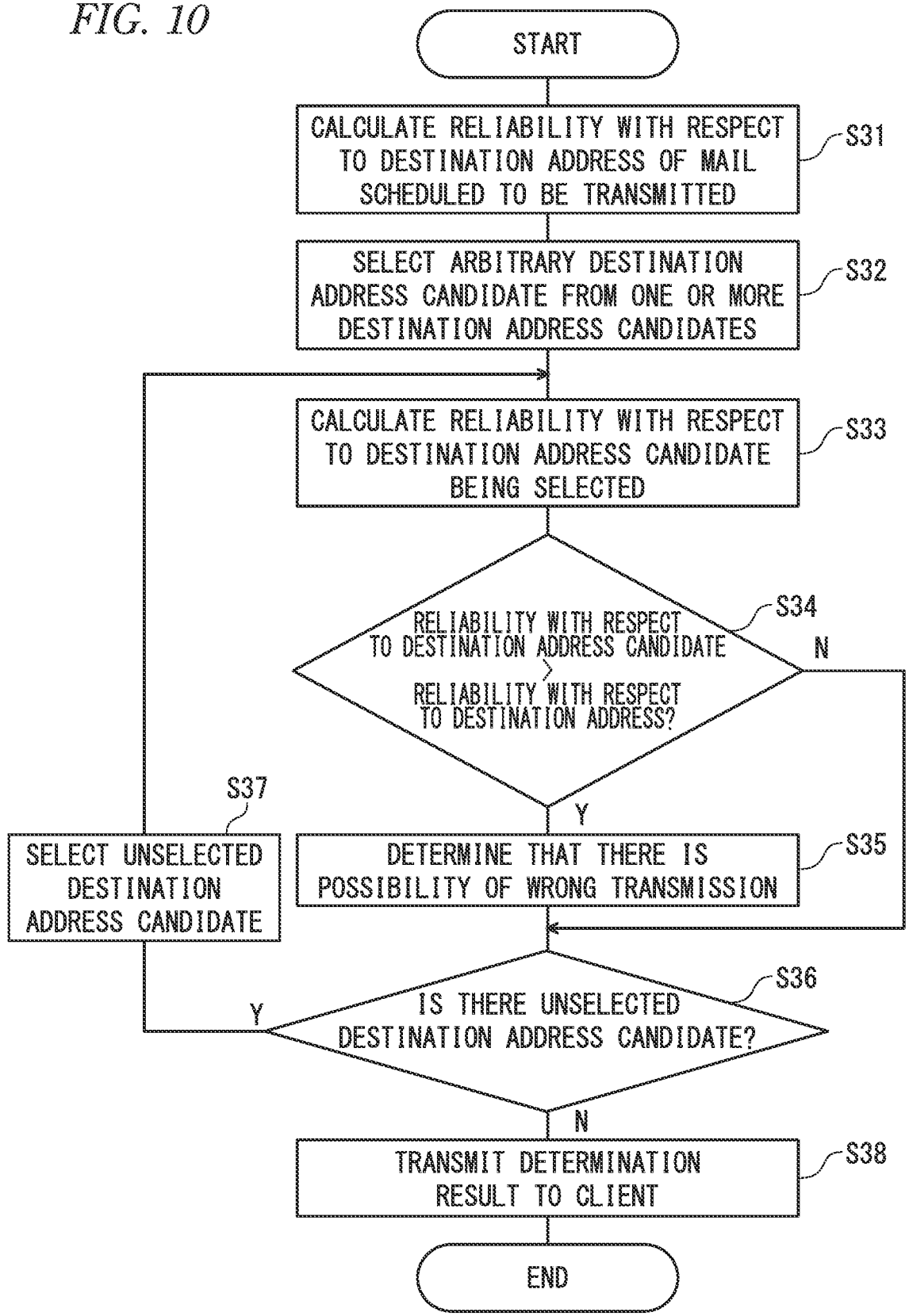
FIG. 10 is a flow chart showing a wrong transmission determination processing routine.

FIG. 10 is a flow chart showing a wrong transmission determination processing routine.

In step S31, the reliability calculation unit 39 calculates reliability with respect to a destination address of a mail scheduled to be transmitted. Specifically, the reliability calculation unit 39 calculates the reliability of a destination address based on a mail body feature vector of the destination address created by the mail body feature vector creation unit 35 and based on a mail body similarity model related to the destination address accumulated in the mail body similarity model accumulation unit 38.

Figure 11:
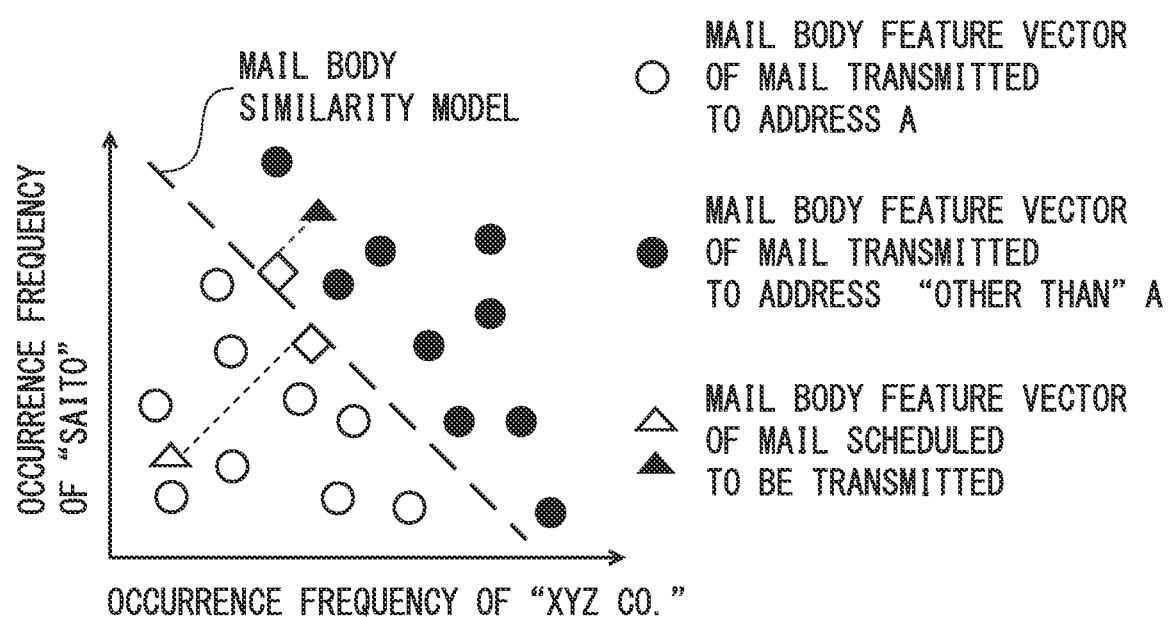
FIG. 11 is a diagram for explaining a method of calculating reliability using a mail body similarity model.

FIG. 11 is a diagram for explaining a method of calculating reliability using a mail body similarity model. Open and filled triangles indicate mail body feature vectors of two mail messages that are scheduled to be transmitted. Reliability corresponds to a distance from the mail body similarity model (a dashed line) to a mail body feature vector (for example, each triangle) which is a calculation object of the reliability. In other words, the longer the distance from the mail body similarity model, the higher the reliability of the mail body feature vector belonging to the region.

In FIG. 11, the open triangle is deep inside a region of open circles, or a distance from the mail body similarity model is long. On the other hand, although the filled triangle is within a region of filled circles, the filled triangle is close to the mail body similarity model, or a distance from the mail body similarity model is short. Therefore, a mail body having the mail body feature vector corresponding to the open triangle can be estimated to be a transmission mail having the address A as its destination address with high reliability thereof. On the other hand, while a mail body having the mail body feature vector corresponding to the filled triangle can be estimated not to be a transmission mail having the address A as its destination address, the reliability thereof is low.

In step S32, the destination address candidate selection unit 33 selects one or more destination address candidates to replace the destination address extracted by the mail message analyzing unit 31 from all addresses registered in the address book 32. The destination address candidate selection unit 33 selects destination address candidates which are addresses similar in appearance to the destination address from the addresses in the address book 32 using, for example, the Levenshtein method or the N-gram method.

For example, using the N-gram method, the destination address candidate selection unit 33 computes, for each address in the address book 32, an address similarity (0 to 100%), which is an indicator of similarity of an address to the destination address, by comparing a local section (user name) of the destination address (without a domain section being appended) with the local section of each address registered in the address book. Then, the destination address candidate selection unit 33 selects addresses with an address similarity equal to or higher than a threshold (for example, 50%) among the address similarities obtained for the respective addresses in the address book 32 as destination address candidates.

Alternatively, the destination address candidate selection unit 33 may compare the destination address with the respective addresses in the address book 32 including comment sections of mail addresses instead of limiting the comparison to the local sections of mail addresses.

For example, in the case of "Tarou Shinjuku" <shinjuku.tarou@example.co.jp>, the comment section is "Tarou Shinjuku". By using the comment section in addition to the local section of addresses included in the address book 32, the destination address candidate selection unit 33 can select destination address candidates with higher similarity to the destination address.

Subsequently, the reliability calculation unit 39 selects an arbitrary destination address candidate from the one or more destination address candidates selected by the destination address candidate selection unit 33, and advances to step S33.

In step S33, the reliability calculation unit 39 calculates reliability with respect to a destination address candidate being selected. Specifically, the reliability calculation unit 39 first reads a mail body similarity model related to the destination address candidate being selected from the mail body similarity model accumulation unit 38. The reliability calculation unit 39 next calculates the reliability of the destination address candidate being selected based on a mail body feature vector of the mail scheduled to be transmitted created by the mail body feature vector creation unit 35 and based on the read mail body similarity model related to the destination address candidate being selected, and advances to step S34.

In step S34, the destination address validity determination unit 40 determines whether or not the "reliability with respect to the destination address candidate" being selected is higher than the "reliability with respect to the destination address", and advances to step S35 in the case of a positive determination but advances to step S36 in the case of a negative determination. Alternatively, even when a negative determination is made, the destination address validity determination unit 40 may advance to step S35 when the reliability with respect to the destination address is lower than a prescribed threshold.

In step S35, the destination address validity determination unit 40 determines that there is a possibility of wrong transmission with respect to a mail message scheduled to be transmitted, sets the destination address candidate being selected as a destination address candidate to be presented to the mail client 10, and advances to step S36. Alternatively, the destination address validity determination unit 40 may set the destination address candidate even when a negative determination is made in step S34 but, at the same time, the reliability with respect to the destination address is lower than the prescribed threshold.

In step S36, the destination address validity determination unit 40 determines whether or not there is an unselected destination address candidate, and advances to step S37 when there is an unselected destination address candidate but advances to step S38 when there is no unselected destination address candidate.

In step S37, the destination address validity determination unit 40 selects an unselected destination address candidate and returns to step S33. Step S33 to step S37 are repetitively executed to compare all combinations of the "reliability with respect to the destination address" and the "reliability with respect to a destination address candidate", and the present routine advances to step S38.

In step S38, the destination address validity determination unit 40 transmits a determination result to the mail client 10. Specifically, when the "reliability with respect to the destination address" is higher than all "reliabilities with respect to destination address candidates", the destination address validity determination unit 40 transmits a determination result to the effect that the possibility of wrong transmission is low to the mail client 10. On the other hand, when there are a plural destination address candidates with hither reliability than the destination address itself, the destination address validity determination unit 40 transmits the plural destination address candidates together with a priority of each destination address candidate according to the reliability of the destination address candidate to the mail client 10.

Moreover, the destination address validity determination unit 40 may also transmit the reliability itself of each of the destination address and the destination address candidates to the mail client 10.

As a result, when the mail client 10 transmits a mail message to the mail wrong transmission determination apparatus 30, the mail client 10 receives a determination result indicating a possibility of wrong transmission.

In addition, together with the determination result indicating that the possibility of wrong transmission is high, the mail client 10 can receive one or more destination address candidates to replace the original destination address from the mail wrong transmission determination apparatus 30. Furthermore, when there are a plural destination address candidates, the mail client 10 can receive priorities of the destination address candidates.

Then, when the possibility of wrong transmission is low, the mail client 10 transmits the mail message that is the transmission object to the mail server 50 (step S6 in FIG. 3), but the mail client 10 displays warning when the possibility of wrong transmission is high (step S5 in FIG. 3).

Figure 12:
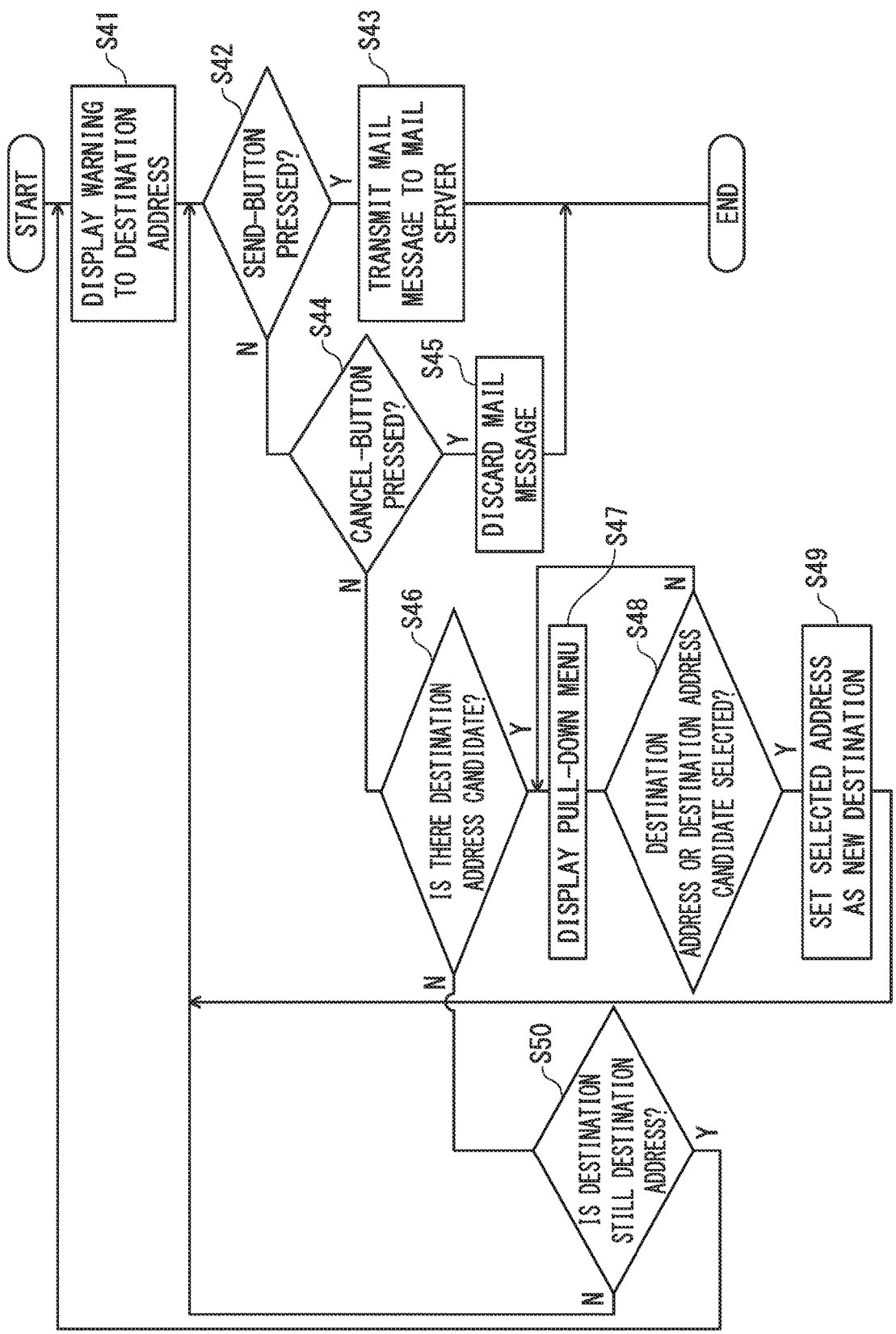
FIG. 12 is a flow chart for executing a warning display routine.

FIG. 12 is a flow chart for executing a warning display routine for displaying warning represented by step S5 in FIG. 3. The control unit 14 of the mail client 10 executes processing of steps S41 and thereafter described below.

In step S41, the control unit 14 temporarily suspends transmission of a mail message to the mail server 50. In addition, the control unit 14 displays a destination address and the mail message on the display unit 12 and displays warning to the destination address, and advances to step S42.

Figure 13:
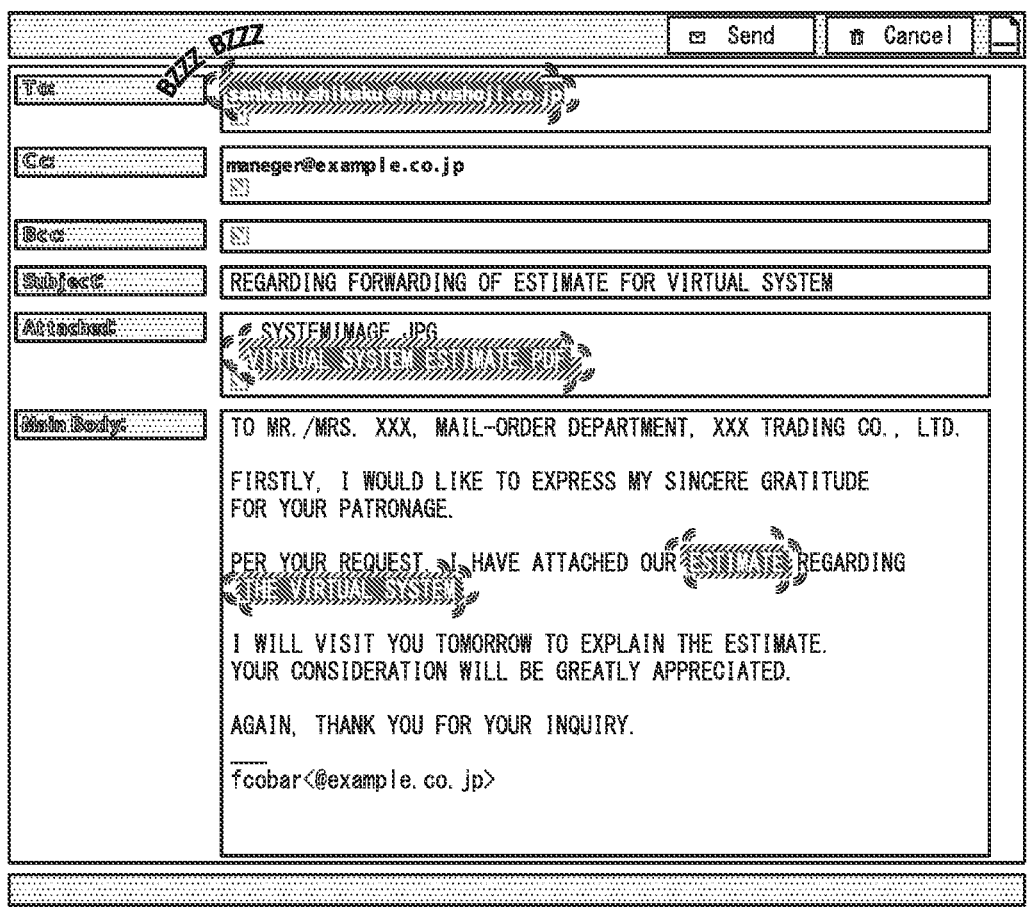
FIG. 13 is a diagram schematically showing warning display.

FIG. 13 is a diagram schematically showing warning display. When a possibility of a specified destination address being wrong is high, the destination address is highlighted and displayed by vibration to warn a user. Alternatively, blinking, a continuous or an intermittent variation of fonts (type, color, and size), or the like may be used instead of the vibration.

Furthermore, in FIG. 13, when an attached file exists or when a prescribed keyword is included in a mail body, a file name of the attached file and the prescribed keyword are highlighted and displayed by vibration. In this case, the prescribed keyword may be a keyword registered with respect to mail messages to all destination addresses or a keyword registered with respect to mail messages to a specific destination address.

An amount of vibration in the vibration display may be changed in accordance with a degree of the warning. For example, the higher the possibility of a transmission to the destination address being a wrong transmission, the larger the amount of vibration of the destination address. In other words, as shown in FIG. 11, the amount of vibration of a given destination address may be increased as an absolute value of reliability expressed as a distance from a mail body similarity model increases when a mail body feature vector of the given destination address exists in a region of a destination address which differs from the given destination address.

In addition, in a case where reliability of a given destination address is within a prescribed range (for example, even when a mail body feature vector of the given destination address exists in a region of a destination address which differs from the given destination address, an absolute value of the reliability expressed as a distance from a mail body similarity model is not sufficiently large) and the given destination address corresponds to at least one of: the destination address being a first destination of a transmission source of an electronic mail; the destination address having a domain which differs from a domain of the transmission source of the electronic mail; the destination address having a specific domain; and the destination address is to be specified in a Bcc field of the electronic mail, the amount of vibration of the given destination address may be increased in accordance with the number of correspondences. Furthermore, a display method which increases the degree of warning by means other than vibration display may be used. Whether or not such conditions are satisfied is determined by the control unit 14 based on the destination address and transmission information of previous electronic mails.

A method of determining whether or not a destination address is to be specified in a Bcc field of an electronic mail will now be described with reference to FIGS. 14 to 16.

FIG. 14 is a diagram showing a frequency table. A frequency table collectively shows a pair of destination addresses to which an electronic mail has previously been simultaneously transmitted, the number of transmissions (frequency) thereof, and a date and time of the last simultaneous transmission to the pair (last updated date/time) regardless of whether the destination address was specified in a TO field or a CC field. While the frequency table used herein organizes a pair of destination addresses, a frequency, and a last updated date/time regardless of a transmission source, the frequency table may organize a pair of destination addresses, a frequency, and a last updated date/time for each transmission source.

For example, when destination addresses (which may be specified in any of a TO field and a CC field) set to an electronic mail transmitted at a given time point in the past are "aaa@aaa.com", "bbb@bbb.com", and "ccc@ccc.com", three pairs of destination addresses ("address 1"; "address 2") are extracted as follows.

"Address 1"; "address 2"
"aaa@aaa.com"; "bbb@bbb.com"
"aaa@aaa.com"; "ccc@ccc.com"
"bbb@bbb.com"; "ccc@ccc.com"

The frequency table includes, as its items, all pairs of destination addresses previously having been transmitted simultaneously, including the three pairs of destination addresses presented above. In addition, the item of each pair describes a frequency transmitted so far and a last updated date/time, which take all previous simultaneous transmissions of electronic mails to the pair into consideration.

Figure 15:
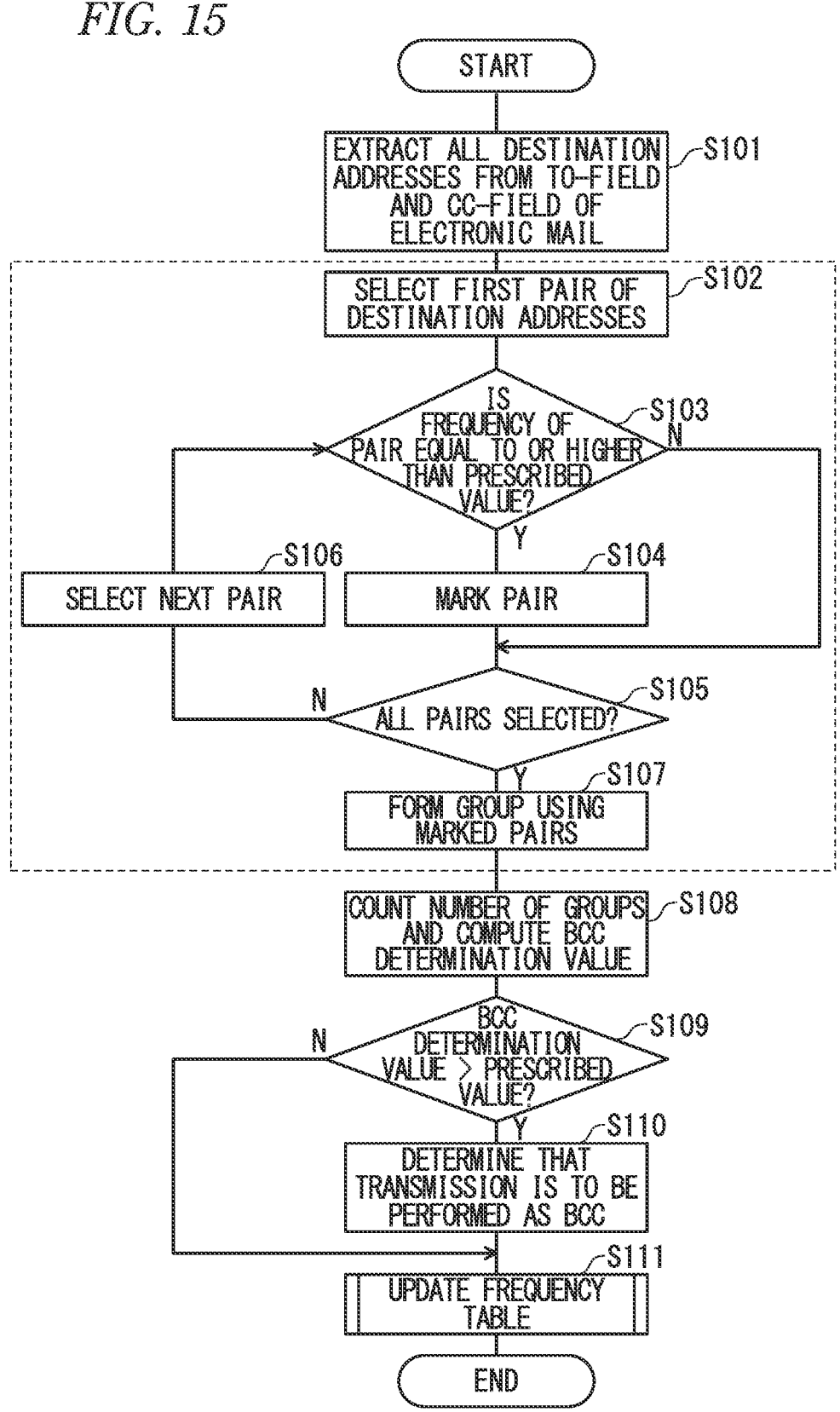
FIG. 15 is a flow chart showing a Bcc (blind carbon copy) determination routine.

FIG. 15 is a flow chart showing a Bcc determination routine for determining whether or not a destination address is to be specified in a Bcc field.

In step S101, the control unit 14 extracts all destination addresses from the TO field and the CC field of an electronic mail scheduled to be transmitted, and advances to step S102.

In step S102, the control unit 14 selects a first pair of destination addresses and advances to step S103. For example, when three destination addresses are extracted in step S101, there are three pairs of destination addresses. In this case, a first pair is selected from the three pairs of destination addresses.

In step S103, the control unit 14 determines whether or not a frequency of the pair selected in step S102 is equal to or higher than a prescribed value, and advances to step S104 in the case of a positive determination but advances to step S105 in the case of a negative determination. In this case, a pair, the frequency of which is equal to or higher than the prescribed value, is assumed to be destination addresses that are strongly connected to each other.

In step S104, since the pair conceivably has a strong connection, the control unit 14 marks the pair and advances to step S105.

In step S105, the control unit 14 determines whether or not all pairs have been selected, and advances to step S107 in the case of a positive determination but advances to step S106 in the case of a negative determination. For example, when there are a total of four destination addresses in the TO field and the CC field of an electronic mail scheduled to be transmitted and thus there are six pairs of destination addresses, a determination is made on whether or not all of the six pairs of destination addresses have been selected.

In step S106, the control unit 14 selects a next pair of destination addresses and returns to step S103. Processing of step S103 to step S106 is repetitively executed, and when a determination of whether or not a pair of destination addresses is to be marked is made for all of the pairs of destination addresses, the present routine advances to step S107.

In step S107, using marked pairs, the control unit 14 groups all destination addresses of the electronic mail scheduled to be transmitted. First, the control unit 14 assumes that each marked pair is a group. Next, the control unit 14 compares two groups with each other and, when the groups share a same destination address, the control unit 14 unifies the two groups into one group. Conversely, when there is no common destination address, the two groups remain separate groups. The control unit 14 compares all of the groups and continues grouping until there is no more common destination addresses among the groups.

In addition, the control unit 14 organizes each of the destination addresses not marked in pairs with any other destination address in step S104 into a single group. Subsequently, the present routine advances to step S108.

Moreover, by considering each destination address a node, an association between two destination addresses an edge, and a frequency a weight of an edge, the processing from step S102 to step S107 is equivalent to a generic problem of creating an aggregate (cluster) of nodes connected by edges with a weight equal to or greater than a prescribed weight. In other words, as long as groups of destination addresses with a strong association can be formed, the processing from step S102 to step S107 is not limited to the above.

In step S108, the control unit 14 counts the number of all groups and computes a Bcc determination value for determining whether or not to perform a Bcc transmission. In this case, the Bcc determination value is a value obtained by dividing the number of groups by the number of all destination addresses (the number of destination addresses extracted in step S101).

In step S109, the control unit 14 determines whether or not the Bcc determination value is larger than a prescribed value, and advances to step S110 in the case of a positive determination but advances to step S111 in the case of a negative determination. The prescribed value is a numeral equal to or larger than 0 and smaller than 1, and is a threshold for determining a degree of existence of a strong connection among destination addresses extracted in step S101.

In other words, the Bcc determination value being larger than the prescribed value indicates that the number of groups formed by destination addresses with strong connections is close to the total number of the original destination addresses or, in other words, there are not many strong connections among individual destination addresses.

Generally, a Bcc transmission is performed when simultaneously transmitting to a large number of destination addresses that are not mutually related to each other. Therefore, when the Bcc determination value is larger than the prescribed value, the electronic mail conceivably is to be transmitted as Bcc. On the other hand, when the Bcc determination value is equal to or smaller than the prescribed value, since a sufficient number of close connections exist among the destination addresses, the electronic mail conceivably need not be transmitted as Bcc.

In step S110, the control unit 14 determines that the electronic mail is to be transmitted as Bcc, causes the display unit 12 to display information to the effect that the electronic mail is to be transmitted as Bcc, and advances to step S111.

In step S111, the control unit 14 updates the frequency table and ends the present routine. More specifically, in the present step, a frequency table update routine described below is executed.

Figure 16:
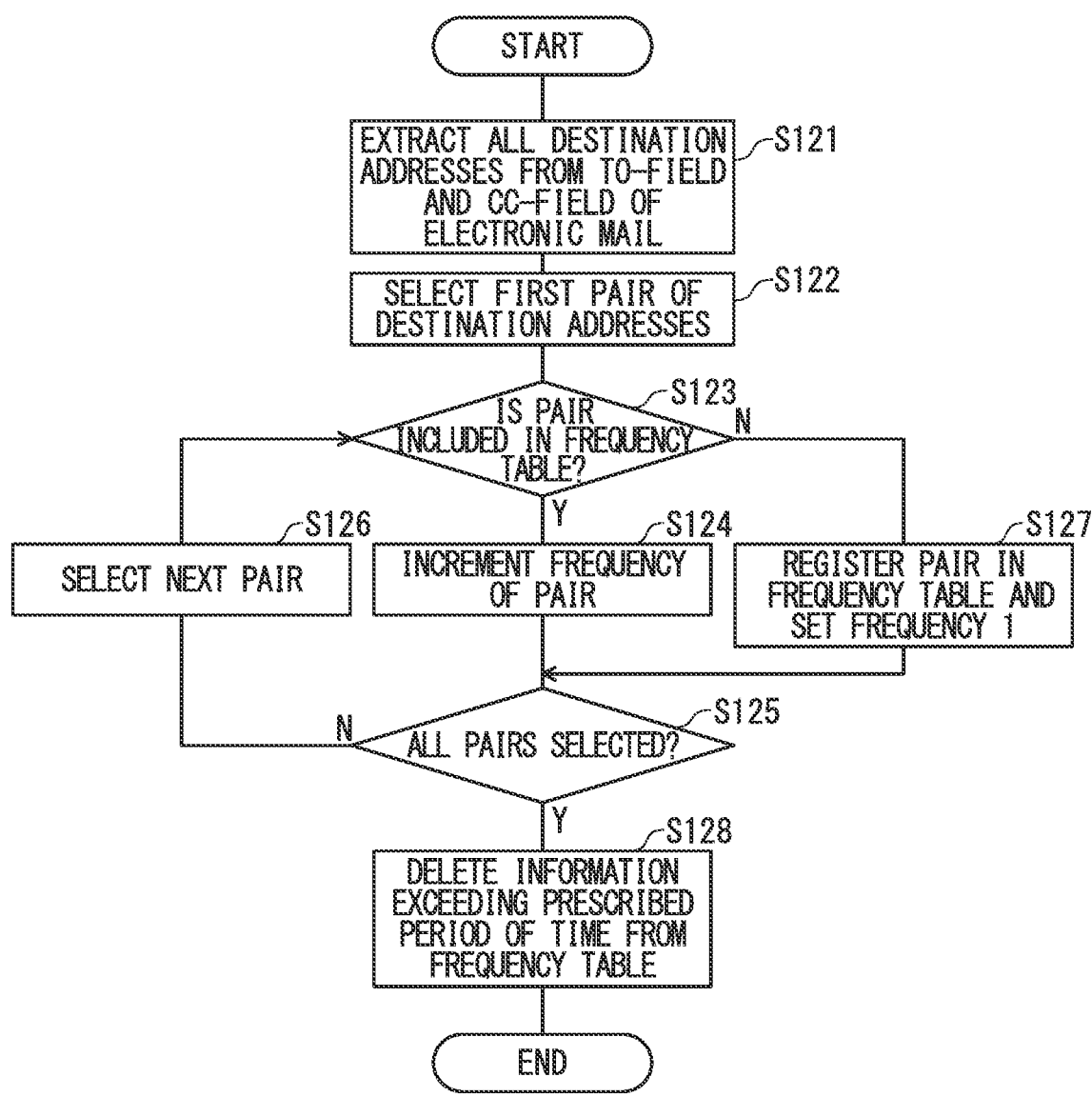
FIG. 16 is a flow chart showing a frequency table update routine.

FIG. 16 is a flowchart showing the frequency table update routine. Here, an update of the frequency table need not necessarily be performed at the timing of step S111 but may be performed at a prescribed time of day.

In step S121, the control unit 14 extracts all destination addresses from the TO field and the CC field of an electronic mail scheduled to be transmitted, and advances to step S122.

In step S122, the control unit 14 selects a first pair of destination addresses and advances to step S123.

In step S123, the control unit 14 determines whether or not the pair selected in step S122 is included in the frequency table, and advances to step S124 in the case of a positive determination but advances to step S127 in the case of a negative determination.

In step S124, the control unit 14 increments (increases by 1) the frequency of the pair, and advances to step S125.

In step S125, the control unit 14 determines whether or not all pairs have been selected, and advances to step S128 in the case of a positive determination but advances to step S126 in the case of a negative determination.

In step S126, the control unit 14 selects a next pair and returns to step S123.

In step S127, the control unit 14 registers the pair in the frequency table, sets the frequency 1 of the pair, and advances to step S125.

For example, when destination addresses (which may be specified in any of a TO field and a CC field) of an electronic mail transmitted at a given time point in the past are "aaa@aaa.com", "bbb@bbb.com", and "ccc@ccc.com", the following three pairs of destination addresses ("address 1"; "address 2") are extracted.

"Address 1"; "address 2"
"aaa@aaa.com"; "bbb@bbb.com"
"aaa@aaa.com"; "ccc@ccc.com"
"bbb@bbb.com"; "ccc@ccc.com"

In this case, since the first item ("aaa@aaa.com"; "bbb@bbb.com") was not included in the frequency table shown in FIG. 14, the first item has been newly registered in the frequency table and the frequency of the pair of the first item has been set to 1. Meanwhile, since the remaining items were already included in the frequency table, frequencies of the respective pairs of the remaining items have been increased by 1 (incremented) and, as a result, respective frequencies thereof have been set from 4 to 5 and from 1 to 2.

In step S128, the control unit 14 deletes items having been registered for a prescribed period of time or more from the frequency table and ends the present routine. At this point, for example, for each pair in the frequency table, the control unit 14 determines whether or not a last updated date/time precedes the present time point by a prescribed period of time or more and, when a prescribed pair satisfies this condition, the control unit 14 deletes the prescribed pair from the frequency table. By constantly updating the frequency table in this manner, the control unit 14 maintains accuracy of determination as to whether an electronic mail is to be transmitted as Bcc or not.

While an example where the control unit 14 of the mail client 10 executes the processing shown in FIGS. 15 and 16 has been described in the present embodiment, the processing may be alternatively executed on the side of the server such as by the mail wrong transmission determination apparatus 30.

Once again returning to FIG. 12, in step S42, the control unit 14 determines whether or not a send-button (refer to a top right section of FIG. 13) displayed on the display unit 12 has been pressed (clicked), and advances to step S43 in the case of a positive determination but advances to step S44 in the case of a negative determination.

In step S43, the control unit 14 transmits the mail message to the mail server 50 and ends the present routine. In this case, since it is conceivable that the user had verified the destination address and then issued an instruction for forced transmission, the mail message is forcibly transmitted to the mail server 50.

In step S44, the control unit 14 determines whether or not a cancel-button (refer to the top right section of FIG. 13) displayed on the display unit 12 has been pressed (clicked), and advances to step S45 in the case of a positive determination but advances to step S46 in the case of a negative determination.

In step S45, the control unit 14 discards (erases) the mail message and ends the present routine.

In step S46, the control unit 14 determines whether or not there are destination address candidates (whether or not one or more destination address candidates have been transmitted from the mail wrong transmission determination apparatus 30), and advances to step S47 in the case of a positive determination but advances to step S50 in the case of a negative determination.

In step S47, the control unit 14 displays a pull-down menu upon detecting a prescribed operation such as positioning of a cursor on a position of the destination address on the display screen, and advances to step S48.

Figure 17:
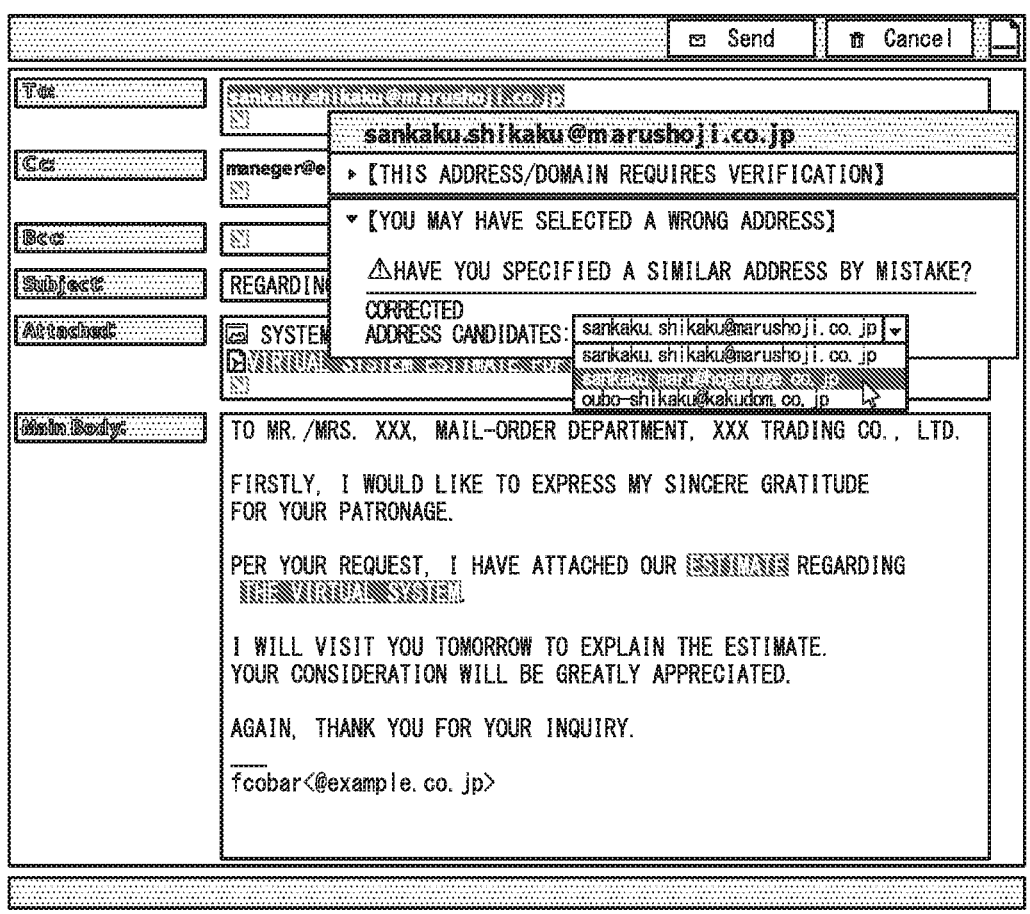
FIG. 17 is a diagram showing a state when a pull-down menu is displayed.

FIG. 17 is a diagram showing a state when a pull-down menu including a destination address and destination address candidates is displayed. The pull-down menu is for prompting the user to select the destination address or a destination address candidate. Therefore, in the pull-down menu, the destination address is displayed in an uppermost section, followed by destination address candidates displayed in a descending order of reliability from up to down.

In step S48, the control unit 14 determines whether the destination address or any of the destination address candidates in the pull-down menu has been selected by the user, and when it is determined that the destination address or any of the destination address candidates has been selected by the user, the control unit 14 advances to step S49.

In step S49, the control unit 14 sets the address (the destination address or a destination address candidate) selected in step S48 as a new destination and returns to step S42. As a result, the address selected from the pull-down menu becomes a new destination address and processing of step S42 and thereafter is executed once again.

In step S50, the control unit 14 determines whether or not the destination is still the first destination address, and returns to step S41 in the case of a positive determination but returns to step S42 in the case of a negative determination. Subsequently, processing of step S41 or step S42 and thereafter is once again executed.

As described above, when suspending the transmission of an electronic mail, the mail client 10 can attract the attention of the user to a destination address by displaying the destination address using vibration. In addition, the mail client 10 can present destination address candidates to replace the current destination address to the user.

In addition, when there are a plural destination address candidates, the mail client 10 can present the user with destination address candidates in a descending order of priority (for example, by placing a destination address candidate with a higher priority at a higher position in a pull-down menu).

It should be noted that the present invention is not limited to the embodiment described above and is also applicable to design modifications implemented within the scope of matters described in the claims.

For example, while the mail wrong transmission determination apparatus 30 is configured independent of the mail client 10 or the mail server 50 in FIG. 1, the mail wrong transmission determination apparatus 30 may be configured so as to be built into the mail client 10 or the mail server 50.

In the embodiment described above, destination addresses are extracted from all mail messages transmitted to the mail wrong transmission determination apparatus 30 shown in FIG. 4 and all of the extracted destination addresses are registered in the address book 32. However, as an alternative to this example, only destination addresses of electronic mails transmitted based on a determination result of mail wrong transmission may be registered in the address book 32.

In addition, while the mail message analyzing unit 31 shown in FIG. 4 performs morphological analysis only on a mail body, morphological analysis may be performed on text information contained in an electronic mail including a mail header and other pieces of information.

A mail body similarity model is not limited to the SVM as long as the mail body similarity model statistically indicates a likelihood of a mail body being related to a specific destination address. As the mail body similarity model, for example, a naive Bayes, a decision tree (CART: Classification And Regression Tree), or a maximum entropy (ME) model may be used.

The mail body similarity model according to the present embodiment is sequentially updated based on mail body feature vectors of all mail messages transmitted to the mail wrong transmission determination apparatus 30. However, the mail body similarity model may be based on mail body feature vectors of a part of mail messages transmitted to the mail wrong transmission determination apparatus 30, which, for example, have been created since a prescribed time point in the past up to today.

In addition, the destination address validity determination unit 40 shown in FIG. 4 may be configured inside the mail client 10 instead of the mail wrong transmission determination apparatus 30.

In this case, the control unit 14 of the mail client 10 shown in FIG. 2 is to include the functions of the destination address validity determination unit 40 described earlier and repetitively execute the processing of steps S34 to S37 shown in FIG. 10 using the respective reliability transmitted from the mail wrong transmission determination apparatus 30. In this manner, a final determination on whether or not a mail wrong transmission has been performed may be made by the mail client 10.

Second Embodiment

The mail wrong transmission determination apparatus 30 according to a second embodiment of the present invention determines a wrong transmission with respect to an electronic mail that is a transmission object without creating a destination address candidate. In this case, in the wrong transmission determination processing routine shown in FIG. 10, processing for selecting a destination address candidate in step S32, and steps S33, S36 and S37 are omitted. In addition, unlike in the first embodiment, the following processing is executed in step S34.

In step S34, the destination address validity determination unit 40 determines whether or not the "reliability with respect to the destination address" is higher than a prescribed threshold, and determines that a possibility of wrong transmission is low in the case of a positive determination but determines that the possibility of wrong transmission is high in the case of a negative determination, and transmits a determination result thereof to the mail client 10.

Using the determination result by the mail wrong transmission determination apparatus 30, the mail client 10 can transmit an electronic mail when the possibility of wrong transmission of the electronic mail is low, or the mail client 10 can temporarily suspend transmission of the electronic mail and display a warning when the possibility of wrong transmission of the electronic mail is high.

Figure 18:
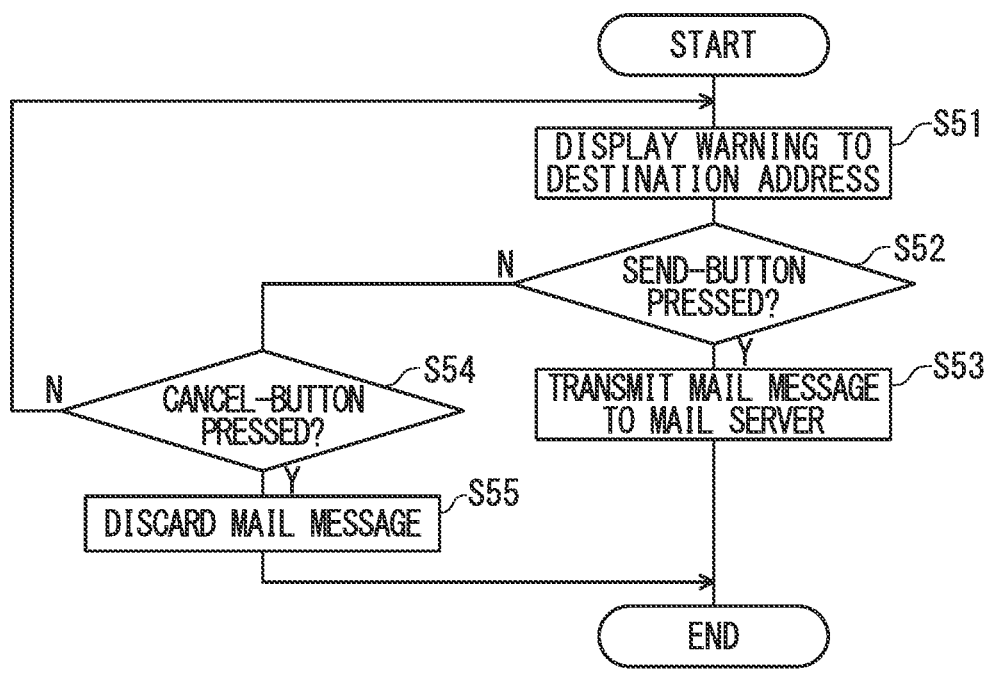
FIG. 18 is a flow chart for executing a warning display routine.

FIG. 18 is a flow chart for executing a warning display routine for displaying warning according to the second embodiment. Steps S51 to S55 in the present routine respectively correspond to steps S41 to S45 in the warning display routine shown in FIG. 12. However, in step S54, the control unit 14 determines whether or not the cancel button displayed on the display unit 12 has been pressed (clicked), and advances to step S55 in the case of a positive determination but returns to step S51 in the case of a negative determination.

At this point, the mail client 10 may seek a final judgment of a user with respect to mail transmission by presenting the reliability transmitted from the mail wrong transmission determination apparatus 30 to the user without modification.

Moreover, the mail client 10, the mail wrong transmission determination apparatus 30, and the mail server 50 described above are not limited to hardware configurations and may be a general-purpose computer installed with a program for executing the processing described above.

In addition, even in the second embodiment, the destination address validity determination unit 40 shown in FIG. 4 may be configured inside the mail client 10 instead of the mail wrong transmission determination apparatus 30.

In this case, the control unit 14 of the mail client 10 shown in FIG. 2 is to include the functions of the destination address validity determination unit 40 described above and execute the processing of step S34 in the second embodiment described earlier using the reliability transmitted from the mail wrong transmission determination apparatus 30. In this manner, a final determination on whether or not a mail wrong transmission has been performed may be made by the mail client 10.

REFERENCE SIGNS LIST

10 Mail client
30 Mail wrong transmission determination apparatus
31 Mail message analyzing unit
32 Address book
33 Destination address candidate selection unit
34 Noun dictionary
35 Mail body feature vector creation unit
36 Mail body feature vector accumulation unit
37 Mail body similarity model creation unit
38 Mail body similarity model accumulation unit
39 Reliability calculation unit
40 Destination address validity determination unit
50 Mail server

The invention claimed is:

1. A warning apparatus for preventing electronic mail wrong transmission, comprising at least one processor and at least one non-volatile computer readable medium including computer program code, the at least one non-volatile memory and the computer code configured to, with the processor, cause the warning apparatus to at least:

transmit an electronic mail comprising a destination address to an electronic mail wrong transmission determination apparatus, the electronic mail wrong transmission determination apparatus configured to create a feature vector related to a content of the electronic mail;

accumulate the feature vector related to a content of a transmitted electronic mail and a destination address of the transmitted electronic mail in association with each other;

select destination address candidates each having a value of a degree of similarity to the destination address, wherein the value is equal to or larger than a prescribed value, from destination addresses of transmitted electronic mails;

create a similarity model for each destination address based on the feature vectors accumulated in association with the destination address and based on the feature vectors accumulated in association with other destination addresses that differ from the destination address;

calculate respective reliabilities of the destination address and the destination address candidates of the electronic mail based on the feature vector which is related to the content of the electronic mail, based on the similarity model which is related to the destination address of the electronic mail, and based on the similarity models which are related to the destination address candidates of the electronic mail;

send a determination result determined based on the respective reliabilities of the destination address and the destination address candidates of the electronic mail;

send reliability information comprising a value indicating a reliability of the destination address of the electronic mail;

receive the determination result indicating a possibility of wrong transmission of the electronic mail, from the electronic mail wrong transmission determination apparatus;

receive the reliability information from the electronic mail wrong transmission determination apparatus, and if the received determination result indicates that the possibility of wrong transmission of the electronic mail is high, a visual effect is applied to a part of the destination address in the electronic mail being displayed, wherein the visual effect comprises a degree of dynamic visual change that corresponds to the value indicating the reliability of the destination address of the electronic mail.

2. The warning apparatus for preventing electronic mail wrong transmission according to claim 1, wherein the visual effect comprises by dynamically changing a font size of the destination address.

3. The warning apparatus for preventing electronic mail wrong transmission according to claim 1, wherein the visual effect comprises by dynamically changing a font color of the destination address.

4. The warning apparatus for preventing electronic mail wrong transmission according to claim 1, wherein the visual effect is selected from a group consisting of dynamically highlighting, vibrating, and blinking.

5. The warning apparatus for preventing electronic mail wrong transmission according to claim 1, in a case where the received reliability is within a prescribed range, and when the destination address corresponds to at least one of: the destination address being a first destination of a transmission source of the electronic mail; the destination address having a domain which differs from a domain of the transmission source of the electronic mail;

the destination address having a specific domain; and the destination address being to be specified in a Bcc field of the electronic mail, further configured to change a display mode of the part of the destination address in accordance with the number of the correspondences.

6. The warning apparatus for preventing electronic mail wrong transmission according to claim 1, further configured to change a display mode of a part of at least one of a file name of a file attached to the electronic mail and a word which occurs in a body of the electronic mail being displayed and which is registered in advance.

7. A non-transitory computer readable medium having recorded therein a program which causes a computer to execute functions of the warning apparatus for preventing electronic mail wrong transmission according to claim 1.

8. The warning apparatus for preventing electronic mail wrong transmission according to claim 1, wherein the similarity model comprises a first feature vector region associated with the destination address and a second feature vector region associated with the other destination addresses separated from each other in a word space composed of dimensions of the number of all words belonging to one or more noun categories and being included in electronic mails and serves as a criterion of determination as to whether or not a feature vector related to a content of an arbitrary electronic mail belongs to the first feature vector region associated with the destination address.

* * * * *